(12) United States Patent
Yun et al.

(10) Patent No.: US 8,285,594 B2
(45) Date of Patent: Oct. 9, 2012

(54) METHOD AND APPARATUS FOR DEFINING DATA OF INTEREST

(75) Inventors: Yeogirl Yun, Sunnyvale, CA (US); Brad Park, Sunnyvale, CA (US)

(73) Assignee: CBS Interactive Inc., Wilmington, DE (US)

( * ) Notice: Subject to any disclaimer, the term of this patent is extended or adjusted under 35 U.S.C. 154(b) by 406 days.

(21) Appl. No.: 12/550,987

(22) Filed: Aug. 31, 2009

(65) Prior Publication Data

US 2010/0005095 A1 Jan. 7, 2010

Related U.S. Application Data

(63) Continuation of application No. 09/287,296, filed on Apr. 7, 1999, now Pat. No. 7,584,120.

(51) Int. Cl.
*G06Q 40/00* (2012.01)

(52) U.S. Cl. ............. 705/26; 705/14.46; 705/26.62; 707/711; 707/748; 709/201; 709/205; 725/116

(58) Field of Classification Search .............. None
See application file for complete search history.

(56) References Cited

U.S. PATENT DOCUMENTS

| | | | |
|---|---|---|---|
| 4,992,940 A * | 2/1991 | Dworkin | 705/26.8 |
| 5,710,887 A * | 1/1998 | Chelliah et al. | 705/26.62 |
| 5,724,521 A | 3/1998 | Dedrick | |
| 5,754,938 A * | 5/1998 | Herz et al. | 725/116 |
| 5,794,207 A * | 8/1998 | Walker et al. | 705/77 |
| 5,799,284 A * | 8/1998 | Bourquin | 705/14.54 |
| 5,838,317 A | 11/1998 | Bolnick et al. | |
| 5,870,716 A * | 2/1999 | Sugiyama et al. | 705/26.43 |
| 5,889,863 A * | 3/1999 | Weber | 705/76 |
| 5,890,137 A * | 3/1999 | Koreeda | 705/26.82 |

(Continued)

FOREIGN PATENT DOCUMENTS

WO    WO 96/12238    *    4/1996

OTHER PUBLICATIONS

Miller et al. "News on-demand for multimedia networks". ACM Press 1993, pp. 383-392.*

(Continued)

*Primary Examiner* — Robert Niquette
(74) *Attorney, Agent, or Firm* — Marc S. Kaufman; Stephen M Hertzler; Reed Smith LLP

(57) ABSTRACT

Some embodiments of the invention include tools for extracting data of interest from the world wide web (WWW). The extraction is accomplished using descriptions of data of interest. The descriptions of data of interest can include computer programs comprising a sequence of instructions and extractor patterns. The extractor patterns can be developed interactively using a web browser integrated into the graphical development environment for creating the descriptions of data of interest. The instructions can be selected from a predetermined list of instructions designed for extracting information from the WWW. The descriptions of data of interest can be grouped into categories sharing common query elements. Multiple descriptions of data of interest in the same category can executed simultaneously using the same query. The descriptions of data of interest can be accessed by a client computer using a web browser to initiate a query. In some embodiments, the descriptions of data of interest are used to provide information about products available for sale over the WWW.

27 Claims, 36 Drawing Sheets

U.S. PATENT DOCUMENTS

| | | | | |
|---|---|---|---|---|
| 5,890,175 | A * | 3/1999 | Wong et al. | 715/236 |
| 5,897,639 | A * | 4/1999 | Greef et al. | 705/26.8 |
| 6,014,639 | A * | 1/2000 | Fohn et al. | 705/26.62 |
| 6,026,429 | A * | 2/2000 | Jones et al. | 709/201 |
| 6,032,145 | A * | 2/2000 | Beall et al. | 705/26.8 |
| 6,073,138 | A * | 6/2000 | de l'Etraz et al. | 707/748 |
| 6,081,788 | A * | 6/2000 | Appleman et al. | 705/14.46 |
| 6,094,649 | A * | 7/2000 | Bowen et al. | 707/711 |
| 6,144,991 | A * | 11/2000 | England | 709/205 |
| 6,216,125 | B1 * | 4/2001 | Johnson | 1/1 |
| 6,282,543 | B1 * | 8/2001 | Kawasaki et al. | 1/1 |
| 6,460,036 | B1 * | 10/2002 | Herz | 707/748 |
| 6,490,567 | B1 | 12/2002 | Gregory | |
| 2003/0105682 | A1 * | 6/2003 | Dicker et al. | 705/27 |

OTHER PUBLICATIONS

Kim, Lucie. WebData.com Debuts Online Shopping Price Comparisons. E-Commerce Times. p. 1-3, Jan. 1999.
WebData.com. p. 1, Dec. 1998.
Buying Online for Dummies IDG Books Worldwide Inc. p. 73,74: p. 174-181, 1998.

* cited by examiner

METHOD AND APPARATUS FOR DEFINING DATA OF INTEREST

BACKGROUND OF THE INVENTION

1. Field of the Invention

This invention relates to the field of defining data of interest. In particular, the invention relates to techniques and tools for enabling non-programmers to define data of interest.

2. Description of the Related Art

The development of the World Wide Web (WWW) has created an explosion in available information resources. However, it has also created a need for programs, or tools, that enable users to locate information of interest.

Two primary types of tools are used to finding information on the WWW: search engines and catalogs. Search engines operate by using a robot, or crawler, to request web pages and add the pages to an index. The search engine receives a word or phrase input from a user and returns matching pages from its index. One example of a search engine is Altavista, http://www.altavista.com/. Catalogs on the other hand are typically maintained by humans and are much smaller in scope. Like a library catalog, each web site is categorized, e.g. a toll-free directory might be categorized under Reference: Telephone Directories: 800 Directories, etc. One example of a catalog system is Yahoo!, http://www.yahoo.com/.

Neither type of system is designed to extract information from WWW sites. For example, if a user wants to find the closing price of a stock along with other information about the stock, neither a search engine nor a web catalog is suitable for this task. Similarly, for comparison price shopping, search engines and web catalogs are unable to extract the relevant information from web sites to offer these features.

Tools have been developed to support comparison price shopping on web sites such as Jango, operated by Excite Corporation, Redwood City, Calif., at http://www.jango.com/ and Junglee, operated by Amazon.com, Seattle, Wash., at http://shoptheweb.amazon.com/. Unlike search engines and web catalogs, these products extract specific information from particular web sites based on a user request. These prior systems are limited because they require sophisticated programming knowledge to enable the comparison shopping program to extract information from each web site. Further, these systems can not easily be extended outside the realm of comparison shopping.

Accordingly, what is needed is a method for defining data of interest usable by non-programmers to enable the extraction of data of interest from web sites.

SUMMARY OF THE INVENTION

Some embodiments of the invention include tools for extracting data of interest from the World Wide Web (WWW). The extraction is accomplished using descriptions of data of interest. The descriptions of data of interest can include computer programs comprising a sequence of instructions and extractor patterns.

In some embodiments, a graphical user interface (GUI) program, or tool, is provided to create the descriptions of data of interest. In some embodiments, the GUI tool includes an integrated web browser that supports the development and testing of extractor patterns. The GUI program supports the use of the extractor patterns in the descriptions of data of interest.

In some embodiments, the GUI program allows selection of instructions from a predetermined list of instructions to construct the description of data of interest. The predetermined list of instructions includes instructions that can retrieve web pages using the hypertext transfer protocol (HTTP) in several fashions. Each instruction in the description of data of interest creates one or more buffers that subsequent instructions can manipulate. This allows a single instruction to retrieve several hundred linked pages based on information in the buffer. Those retrieved pages each are retrieved into a separate buffer used by subsequent instructions.

The extractor patterns can include regular expressions. By allowing the regular expressions to be developed and tested directly within the web browser, non-programmers can easily develop descriptions of data of interest.

The descriptions of data of interest can be grouped into categories sharing common extraction parameters. Multiple descriptions of data of interest in the same category can be executed simultaneously using the same query.

A client computer using a web browser to initiate a query by causing an access of the descriptions of data of interest at a server.

In some embodiments, the descriptions of data of interest are used to provide information about products available for sale over the WWW from multiple sources. A selection of a product category from a predetermined set of product categories can be made using information about the product. For example, for a Macintosh desktop computer product, the "Macintosh Desktop" category might be selected from a set of product categories including "PC Desktops", "PC Notebooks", "Handheld Computers", "Macintosh Desktops", and "Macintosh Notebooks".

The extraction parameters, or inputs, for the category are then accessed. For example, the "Macintosh Desktops" category might have an input that allows the processor type to be selected.

One or more of the extraction parameters can be selected for the development of descriptions of data of interest.

For each of the sources of the product, a corresponding description of data of interest, or program, is created. The program identifies a corresponding web site selling the product for the source. The GUI tool can be used to create the corresponding program to extract the product information using the selected extraction parameters from the web site.

Once the descriptions are prepared, a connection from a client computer can be received. The value of the selected extraction parameters can be supplied with the connection. In some embodiments, the connection is an HTTP POST method including values for the selected extraction parameters responsive to a completed hypertext markup language (HTML) form.

The values for the selected extraction parameters can be used to run all of the programs in the selected category to extract product information from the corresponding web sites. The programs can be run in parallel or in series. The extracted information can be presented in a web page transmitted to the client computer.

BRIEF DESCRIPTION OF THE FIGURES

FIGS. 6-36 illustrate the development of a description of data of interest.

DETAILED DESCRIPTION

A. System Overview

Figure 1:
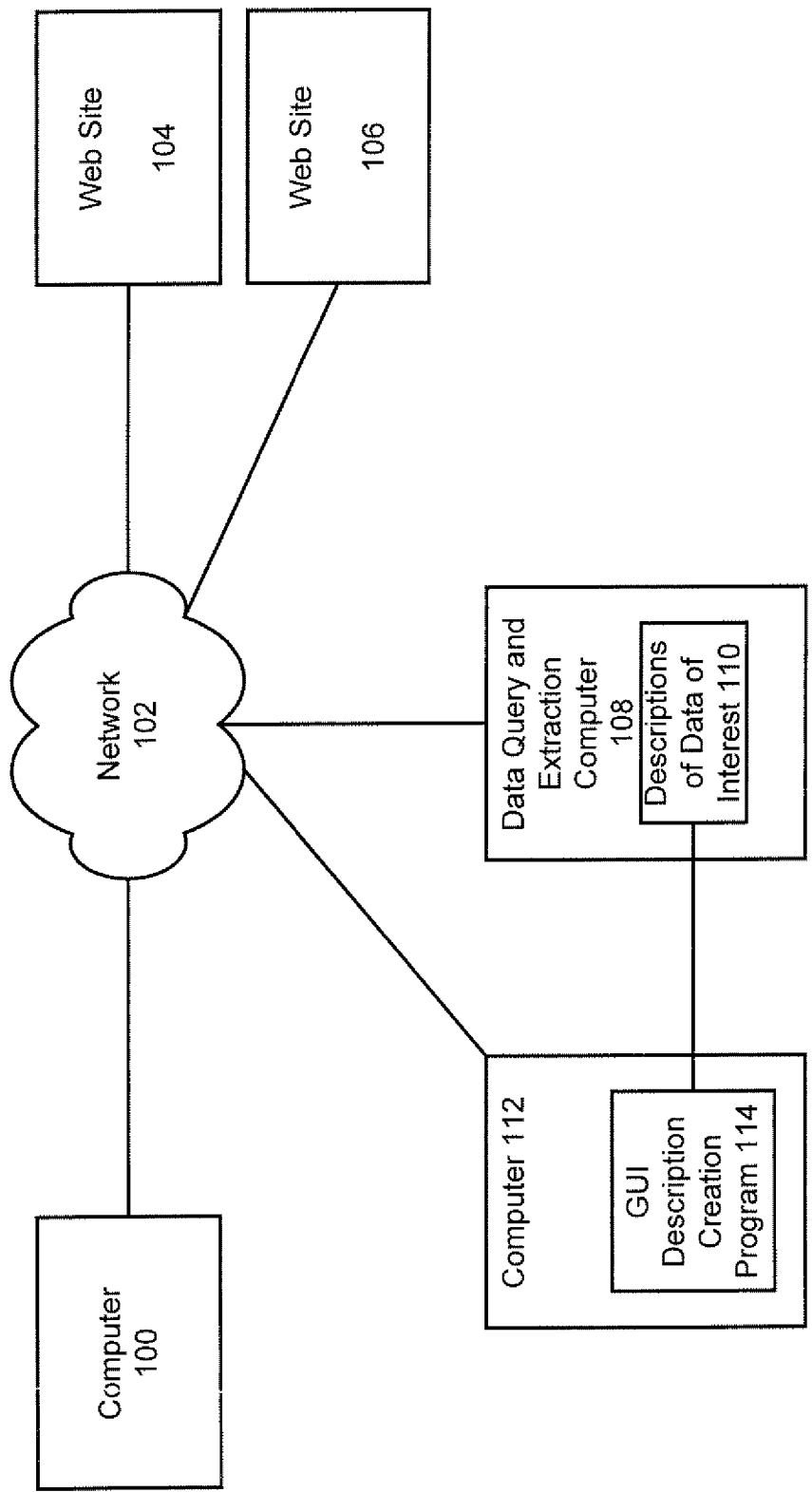
FIG. 1 illustrates computers using one embodiment of the invention.

FIG. 1 illustrates computers using one embodiment of the invention. FIG. 1 includes a computer that uses the data query and extraction computer and a computer used for creating descriptions of data of interest.

The following paragraph lists the elements of FIG. 1 and describes their interconnections. FIG. 1 includes a computer 100, a network 102, a web site 104, a web site 106, a data query and extraction computer 108, and a computer 112. The data query and extraction computer 108 includes descriptions of data of interest 110. The computer 112 includes a graphical user interface (GUI) description creation program 114. The network 102 is coupled in communication with the computer 100, the web sites 104-106, the data query and extraction computer 108 and the computer 112. The GUI description creation program 114 is coupled in communication with the descriptions of data of interest 110 either through the network 102, or through some other communications channel.

The following lists the uses of the elements of FIG. 1. The network 102 is a network such as the Internet, an Intranet, an Extranet, or some other type of network. The network 102 supports communications between the computers 100, 108 and 1112 and the web sites 104-106 of FIG. 1. In this example, the network 102 is the Internet. The computer 100, the web sites 104-106, the data query and extraction computer 108, and the computer 112 may be coupled to the network 102 by firewalls, or other types of access protection devices.

The data query and extraction computer 108 supports programs for receiving requests from computers, such as the computer 100, to extract data from web sites, such as the web sites 104-106. The data query and extraction computer 108 may be a single computer or multiple computers. The data query and extraction computer 108 may directly store the descriptions of data of interest 110, or it may be coupled to another computer storing the descriptions of data of interest 110. Typically, the data query and extraction computer 108 is comprised of one or more UNIX server computers, Windows NT server computers, or some other computers. The data query and extraction computer 108 may operate a hypertext transfer protocol (HTTP) server, or web server, to receive requests from clients (e.g., the computer 100). Alternatively, other protocols can be used to allow client computers to make extraction requests.

The computer 100 is a computer such as a personal computer, a thin-client computer, a set top box, a handheld computer, or some other type of computer. The computer 100 can use a web browser such as Netscape Navigator, from Netscape Inc., Mountain View, Calif., to access the data query and extraction computer 108. Other web browsers and programs can be used to access the data query and extraction computer 108. If proprietary protocols are used to access the data query and extraction computer 108, software supporting those proprietary protocols should be available on the computer 100.

The computer 112 is a computer such as a personal computer, a server computer, or some other type of computer. The computer 112 can use the data query and extraction computer 108 to extract data of interest from web sites in the same manner as described from the computer 100. The computer 112 supports a GUI description creation program 114, or tool, that enables the development of additional descriptions of data of interest for inclusion in the descriptions of data of interest 110. Using the GUI description creation program 114, non-programmers can identify and describe the data of interest on web sites such as the web sites 104-106. Once a description of data of interest is created, it can be made available in the descriptions of data of interest 110 for use by clients such as the computer 100.

The web sites 104-106 are collections of individual web pages that are logically related to one another. For example, the web site 104 could include the web pages of an online bookseller and the web site 106 could include the web pages of an online stock information service. The web sites 104-106 may be hosted by a single computer multiple computers, or supported through some other arrangement. In this example, each of the web sites 104-106 is hosted by a single computer. Protocols other than HTTP could be used to access the data of interest, e.g. file transfer protocol (FTP), simple mail transport protocol (SMTP), network news transport protocol (NNTP), the information retrieval service definition and protocol specification for library applications (ANSI/NISO Z.39-50 standard), or some other protocol. For example, if the web site 104 includes data of interest accessible through the FTP, the description of the data of interest can so indicate and the data query and extraction computer 108 can access that information.

B. Extracting Data

Figure 2:
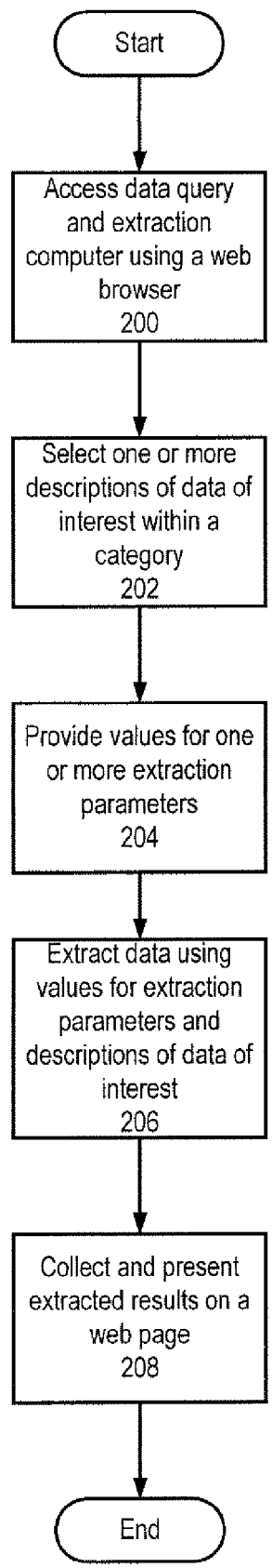
FIG. 2 is a process flow diagram for using descriptions of data of interest to extract information of interest from web sites.

FIG. 2 is a process flow diagram for using descriptions of data of interest to extract information of interest from web sites. This method can be used by the computer 100 to request that information be extracted by the data query and extraction computer 108.

First, at step 200, the computer 100 accesses the data query and extraction computer 108 using a web browser and the URL of the data query and extraction computer 108.

Next, at step 202, the data query and extraction computer 108 will provide a web page to the computer 100 that allows for the selection of one or more descriptions of data of interest. In some embodiments, the descriptions of data of interest will be hierarchically grouped into categories. For example, if the data query and extraction computer 108 supports comparison price shopping, the computer category might be further sub-categorized into "Desktop PCs", "Notebook PCs", "Macintosh Compatible Systems", etc. Similarly, if the data query and extraction computer 108 is an information retrieval service for stock data and news reports, the stock category might have sub-categories for different sectors: "Technology", "Durable Goods", etc.

Within the "Macintosh Compatible Systems" sub-category, there would be one or more descriptions of data of interest. In this example, each description of data of interest corresponds to at least one web site where data is to be extracted. For example, the "Macintosh Compatible Systems" sub-category might include a description of data of interest for the Apple Store, a description of data of interest for a auction company selling Macintosh compatible systems, and a description of data for a computer store that sells Apple computers.

The web page presented to the computer 100 by the data query and extraction computer 108 may allow for explicit selection of which descriptions of data of interest will be used. In this embodiment, once a category with descriptions of data of interest is selected, the user is prompted to select specific descriptions of data of interest to use. In some embodiments, the descriptions of data of interest are selected automatically once the category is selected. In this embodiment, all of the descriptions of data of interest in the selected category are used. In other embodiments, limits based on type of description can be used. For example in a comparison shopping service, there could be options to limit the descriptions of data of interest used based on the type of merchant, e.g. retailer, auction site, or classified ads.

Next at step 204, values for the extraction parameters are provided by the computer 100. Each category includes a set of extraction parameters. The sets of extraction parameters can be stored with the descriptions of data of interest 110, but could also be stored elsewhere. For example, the Macintosh compatible systems category might have extraction parameters for processor type, processor speed, manufacturer, and price. The computer 100 provides values for one or more of these parameters to initiate a query and extraction operation. In some embodiments, the data query and extraction computer 108 generates a web page based on the extraction parameters in the category selected, the web page includes a form with inputs for receiving values for the extraction parameters.

Some extraction parameters have a fixed number of values, or a specific type. For example, in searching for a Macintosh compatible system, the processor type extraction parameter might be limited to the following values: "PowerPPC/603", "PowerPPC/604", and "PowerPPC/G3". In this case, instead of providing a text input field, a pop-up menu, or a group of radio boxes can be displayed on the web page form sent to the computer 100.

At step 208, the values of the extraction parameters are provided to the data query and extraction computer 108. For example, the computer 100 might specify the value of the processor type extraction parameter as "PowerPPC/G3", and no other extraction parameter values. The data query and extraction computer 108 uses the values of the extraction parameters in conjunction with the selected descriptions of data of interest 110 to extract data from the web sites 104-106.

The query and extraction of data from the web sites can occur in parallel or in sequence. For each of the sites, the corresponding description of data of interest is used to retrieve results from the corresponding web site. For example, the description of data of interest X is for the merchant X operating the web site 104 and the description of data of interest Y is for the merchant Y operating the web site 106. The two descriptions X and Y can be executed in parallel or in sequence to extract the appropriate data from the web sites 104-106.

Lastly, at step 208, the extracted data of interest is collected and presented on a web page. The web page is sent to the computer 100. The results web page can be presented incrementally as information is extracted from the web sites. If a protocol other than HTTP is being used, the extracted data can be returned in other fashions. The resulting page can include links that allow the extracted data to be sorted by different outputs, e.g. price, warranty lengths product availability, etc.

C. Describing Data of Interest

1. Categories

Figure 3:
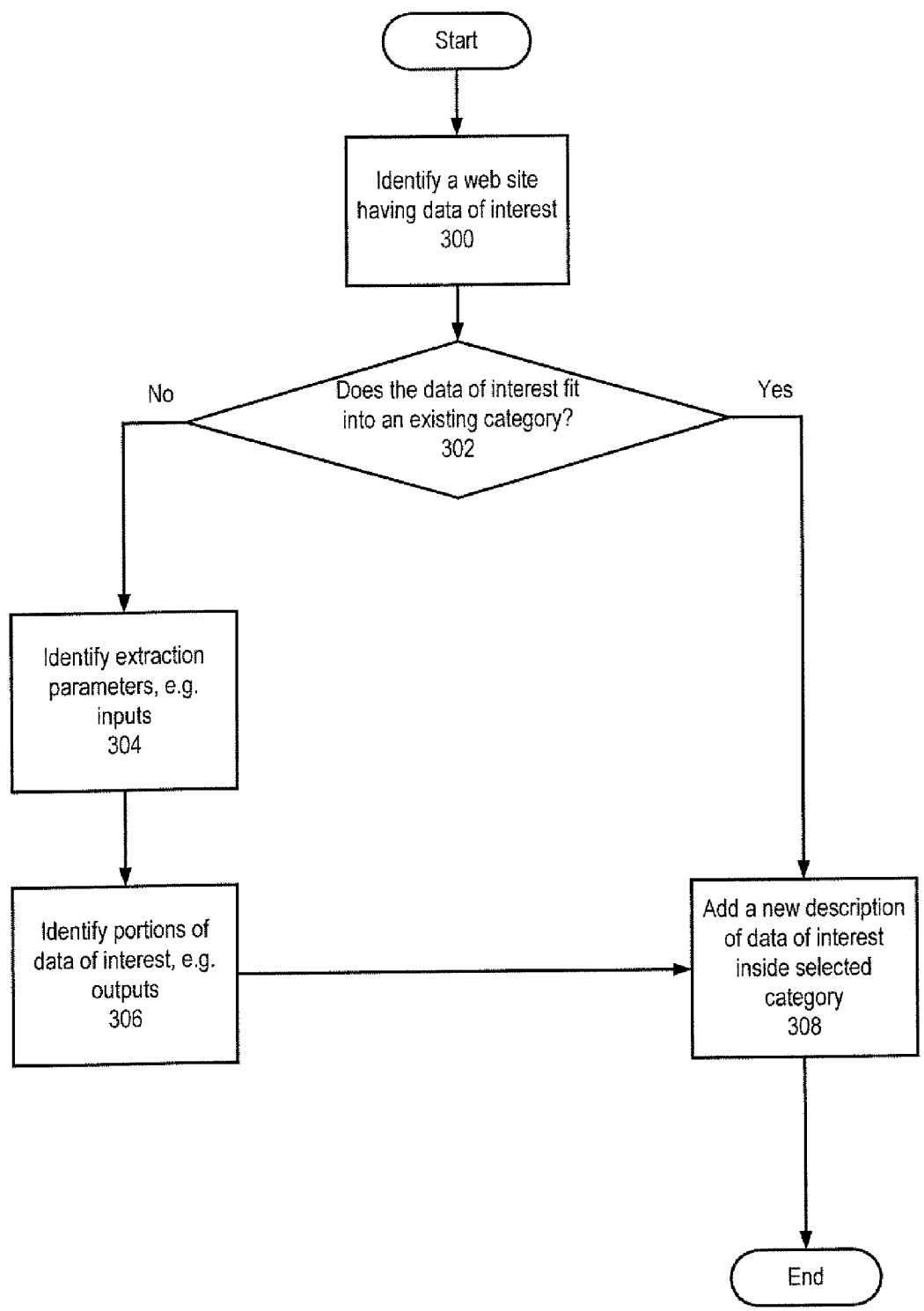
FIG. 3 is a process flow diagram for creating a description of data of interest using a graphical user interface description creation program.

FIG. 3 is a process flow diagram for creating a description of data of interest using the GUI description creation program 114. This process could be used by the computer 112 to add to the descriptions of data of interest 110.

First, at step 300, the author identifies a web site that has data of interest. In a shopping comparison system, the data of interest corresponds to a merchant, or seller, with a web site. In other uses, the web sites might correspond to information sources, e.g. a news organization web site. Typically, the web site is examined further at this stage to determine whether it is desirable to develop a description of data of interest for the web site.

At step 302, the author decides whether a particular type of information, good, or service available at the web site, fits into an existing category, or sub-category. For example, if the products are computer books, a decision can be made as to whether to include this product in an existing category for books, or to create a new category, or sub-category, for computer books. If the product fits into an existing category, the process continues at step 308. Otherwise, the process continues at step 304.

At step 304, the author specified the extraction parameters, e.g. inputs, for the new category. The exact inputs will vary based on the category. The extraction parameters are the types of attributes or criteria that a user of the computer 100 can use to control the extraction of data of interest. For example, in the books category of a comparison shopping service, the extraction parameters might include the title and the author. Some extraction parameters may be common across multiple categories. For example, if the data query and extraction computer 108 is providing comparison shopping services, then many categories will offer minimum and maximum price extraction parameters.

At step 306, the author specifies the portions of data of interest, e.g. outputs. The exact outputs will vary based on the category. Some outputs may be shared across multiple categories, e.g. price and availability on a comparison shopping service or recent headlines on an information service. For example, in the books category of a comparison shopping service, the outputs might include the title, the author, the publisher, the price, and whether the item is in stock. It is not necessary for all of the sites within a category to provide results in every field. For example, an auction site might not include the same type of detail about the publisher of a book that a bookstore would. Thus, the inputs and outputs represent the maximum amount of information that is provided or extracted, rather than required elements.

Finally, at step 308, a new description of data of interested is added inside the selected category.

If a merchant sells multiple types of products, the process of steps 302-308 will be repeated for each of type of product. For example, a merchant that sells books, music, and computer software, might need three different descriptions of data of interest, one for each category. In many cases, the description of data of interest developed for one category can be used with slight modification in the other categories.

The categories and other information developed in steps 302-306 can be developed using the graphical user interface (GUI) description creation program 114, or tool. The GUI description creation program 114 can support editing existing categories to add and/or remove inputs and outputs.

2. Descriptions

Figure 4:
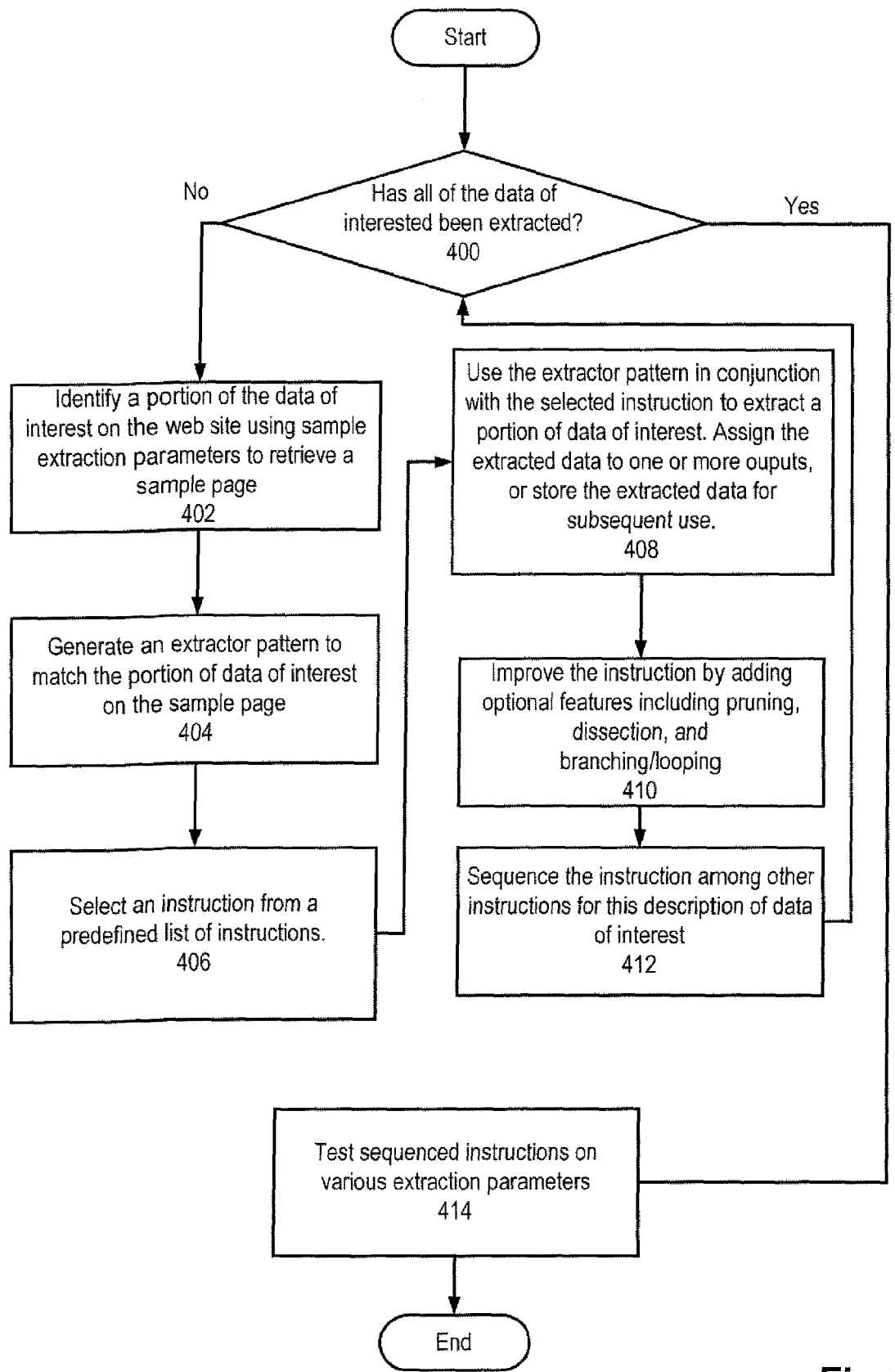
FIG. 4 is a process flow diagram for creating descriptions of data of interest.

FIG. 4 is a process flow diagram for creating descriptions of data of interest. The process of FIG. 4 could be used at step 308 of FIG. 3 to add a new description of data of interest inside a selected category.

At step 400, if all of the data of interest has been extracted, the process continues at step 414. Otherwise, the program for describing the data of interest is developed starting at step 402.

At step 402, a portion of the data of interest is identified on the web site using sample extraction parameters. The GUI description creation program 114 can support an integrated web browser. The integrated web browser enables the user to develop the data of interest interactively by creating extractor patterns.

In a search for books on a bookseller's web site, typically a search feature would be used. Thus, in this example, at step 402, the user creates a sample search using sample extraction parameters to retrieve a results page. The process continues at step 406, where the user selects a first instruction from a predefined list of instructions. The instruction indicates that the program should retrieve the results page using extraction parameters. This can be done by using the GUI description creation program to extract the form into an instruction automatically. The user can then assign extraction parameters to the form inputs. For example, the user could assign the title extraction parameter to one of the form inputs. The process continues at step 408, where the results page is stored for use in subsequent steps, then the process continues at step 400, and since the data of interest has still not been extracted, the process continues at step 402.

This time, at step 402, the user can run the program created so far. The GUI description creation program 114 will prompt the user to input a title, and any other inputs assigned in the first instruction. The resulting page will be a set of results. Again, the GUI description creation program 114 can be used to identify portions of data of interest on the page.

At step 404, extractor patterns are developed for a portion of data of interest. For example, if the results page includes the title, the author, and the price, three extractor patterns could be developed. An extractor pattern can be developed by interactively selecting portions of the web page, or web page source, in the browser view of the GUI description creation program 114.

In some embodiments, an extractor pattern is comprised of three regular expressions, a pre-condition regular expression, a portion of data of interest regular expression, and a post-condition regular expression. For example, to match a title that always appears in bold just after a list element, the pre-condition regular expression would be the regular expression "<LI><B>". The portion of data of interest regular expression would be the regular expression "[^<]*". The post-condition regular expression would be the regular expression "</B>". Without the pre-condition and the post-condition, the portion of data of interest regular expression would match any sequence of characters before a "<", the symbol used to indicate the start of an HTML tag. The pre-condition and post-condition regular expressions narrow the match of the portion of data of interest regular expression to relevant matching strings.

Alternatively, a single regular expression can be used together with a value indicating the portion of interest. For example, many regular expression systems treat parentheses as creating an entity that can then be referred to subsequently. For example, the regular expression "<LI><B>([^<]*)</B>" might be used to duplicate the effect of the three regular expressions above. Most regular systems would treat the "[^<]" portion within parenthesis as an entity that could be referred to as "\1" because it was inside the first set of parenthesis. The regular expression could be associated with the value "1" to indicate that the first entity has the portion of data of interest.

The GUI description creation program 114 allows the extractor patterns to be developed on the source view of a web page. The matching portion to be displayed as rendered HTML code in a preview window. A control can switch the contents of the preview window between showing the entire matching portion or just the portion of interest. Additionally, a number of predefined regular expressions are available including ones for matching tables, hyperlinks, frames, prices, forms, and other patterns.

At step 406, an instruction is selected from a predefined list of instructions. The GUI description creation program 114 offers a set of predetermined instructions designed to extract data from web pages easily. Table 1 includes a list of predefined instructions used in one embodiment of the invention and the uses for each of the instructions.

TABLE 1

| Instruction | Uses |
| --- | --- |
| Get, D-get, N-get, B-get, post, D-post, N-post, and B-post | These eight instructions are collectively referred to as get/post instructions. Get is used to retrieve a URL into the buffer using the HTTP GET method. The D- and B-get instructions operate on the current buffer. An extractor pattern identifies URLs within the current buffer, the D- and B-get instructions retrieve the web pages corresponding to the matching URLs. For example, if the buffer has links to search results, D-get can be used to retrieve all of the linked pages for further operations. The B-get instruction uses the HTML BASE tag in the buffer to determine the absolute URL to retrieve. The N-get instruction is used to retrieve pages from a variable storing data. For example, if in the first step of a program data is stored in a variable, a later step can use the N-get instruction to retrieve matching pages using the data stored in the variable. The D-, N-, and B-get instructions produce multiple result buffers that subsequent instructions in the program operate on separately. The post, D-post, N-post, and B-post instructions function like the corresponding get instructions, but use the HTTP POST method to submit the URL and parameters to the remote web server. |
| Value | Value is used to make a variable the current buffer for subsequent operations. When looping is used to load multiple pages of results, the pages can be stored into a variable and then a value instruction can be used to make the variable the buffer for subsequent operations. |
| Dissect | Dissect is used in conjunction with an extractor pattern to segment the current buffer into multiple units, or new buffers. Each of the resulting units is a buffer that subsequent instructions in the program operate on separately. |
| Skip | Skip is used when branching, pruning, or variable assignment sub-steps are needed without a concurrent need to retrieve additional data from the web. |
| Results | Results is used as the last step of a program. The instruction is associated with sub-steps that store the data of interest in the outputs. All of the desired outputs will be associated with patterns in the current buffer, or stored variables. |
| Call | Call is used to execute another program. This allows descriptions of data of interest to be chained together. |

In this example, the selected instruction is a results instruction.

Next, at step 408, the extractor pattern, or patterns, developed at step 404 are used in conjunction with the selected instruction. This typically results in either the creation of additional buffers or the extraction of data. These additional buffers or extracted data can be stored. Alternatively, the extracted data can be associated with one or more outputs. For example, if the extractor pattern developed at step 404 is an extractor pattern for the title, a sub-step of the results instruction could associate the title extractor pattern with the title output.

At step 410, the instruction can be improved by adding optional features. For example, pruning can be used to remove portions of the buffer that matched the pattern, but that do not correspond to data of interest. If the extraction parameter was a title, but the web search also found authors with that value, pruning can remove the portions that do not have the extraction parameter in the title area. Dissection can be used to segment a web page into units using an extractor pattern for later extraction from the units. Branching, or looping, can be used to create more sophisticated programs, for example, if a web site only returns the first ten matches, looping can be used to retrieve all of the matches from the web site.

At step 412, the new instruction is sequenced among other instructions. Recall that the first instruction in the program created a buffer with the results of a form submission for use by the step being developed to extract information. In this example, the title is the only output sought. Therefore, the sequence of instructions will be the get instruction that retrieves the search results followed by the results instruction that extracts the title. The process then continues to step 400.

At step 400, because all of the data of interest has been extracted, control continues to step 414.

At step 414, additional testing of the sequenced instructions can be done. Once the script is adequately tested, it can be released by the GUI description creation program 114 for use by the data query and extraction computer 108 as description of data of interest 110.

D. Conceptual View of a Web Page

Figure 5:
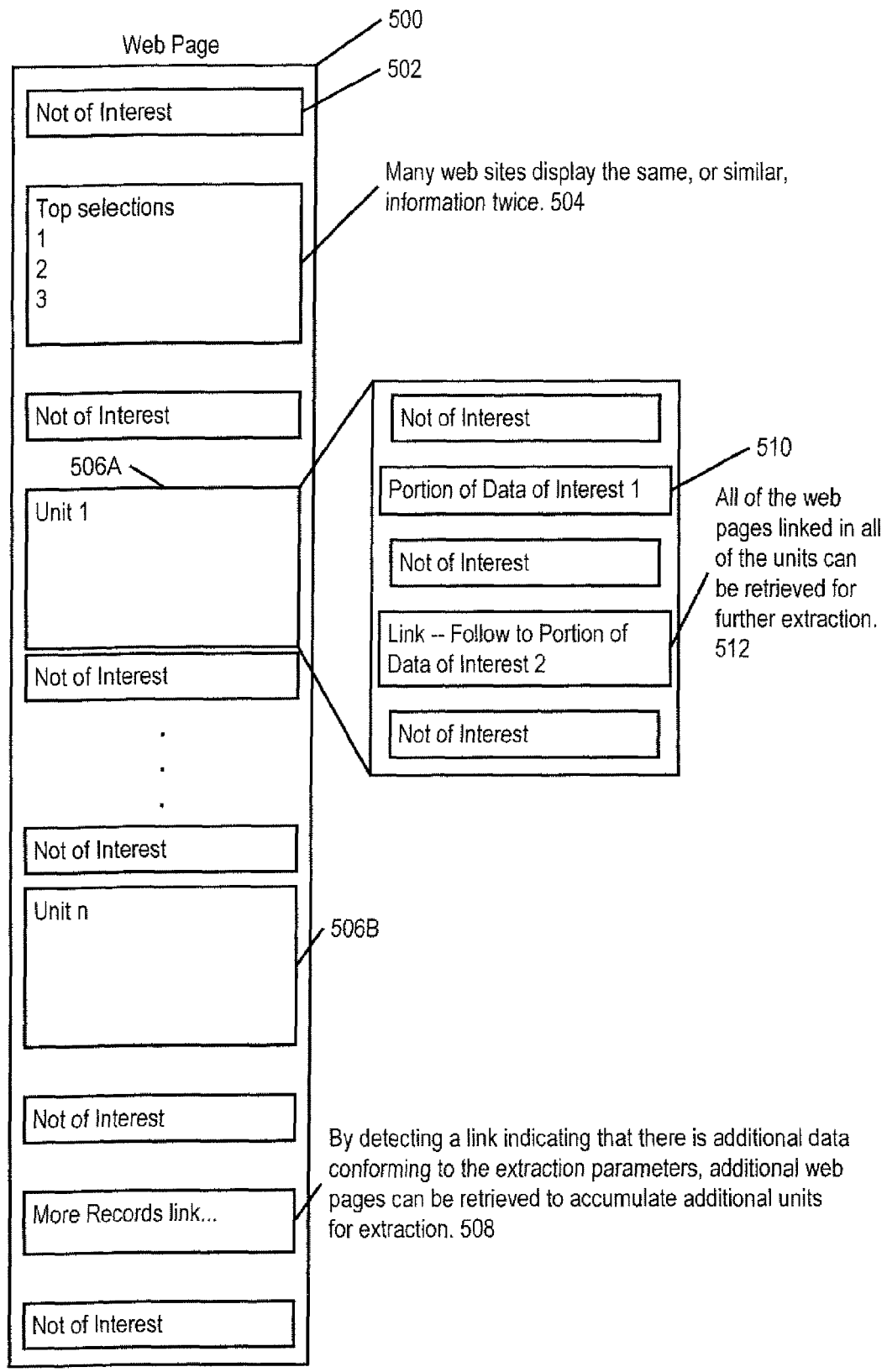
FIG. 5 illustrates how information of interest in a hypertext markup language document can be identified using extractor patterns and instructions.

FIG. 5 illustrates how information of interest in a hypertext markup language document can be identified using extractor patterns and instructions.

The following paragraph lists the elements of FIG. 5. FIG. 5 includes a web page 500. The web page 500 includes information that is not of interest 502, repeated information 504, units of information 506A-B, and a link to more information 508. The unit of information 506A includes a first portion of data of interest 510 and a link to a second portion of data of interest 512.

The web page 500 includes information that is not of interest 502. This might include navigation links, advertising, descriptions, and other types of information. In developing extractor patterns, it is important to test that they do not match the information that is not of interest 502. One technique to reduce this probability is to use the dissect instruction to divide the web page 500 into units of information 506A-B.

Each of the units of information 506A-B matches an extractor pattern. Typically, units share a common structure. Once a web page has been dissected into units, further program instructions operate on each of the units as an individual buffer. Many web sites include repeated information 504, e.g. top choices. Dissecting the web page prevents subsequent extractor patterns from matching in the repeated information 504.

Each of the units of information 506A-B will be operated on by subsequent instructions in the description of data of interest. Thus, subsequent extractor patterns will only match on data within a unit. The unit of information 500A includes a first portion of data of interest 510 that is suitable for immediate extraction. The unit of information 500A also includes a link to a second portion of data of interest 512. A get/post instruction can be used to match the link 512 in the unit 506A and retrieve the linked web page for extraction of the second portion of data of interest. The information extracted from the units 506A-B on the web page 500 can then be combined with the information extracted by the D-Get. In this fashion, information from multiple depths of the web site hierarchy can be combined.

The link to more information 508 can be detected with an extractor pattern. By building a loop, all of the information can be retrieved and stored for extraction across all of the data of interest.

Additionally, branches can be set up to detect error conditions. One type of error condition is that no records were found. For example, searching for a book titled "Where's Weldo" is unlikely to produce any results, by developing an extractor pattern for the case where there are no matching products at the web site, a branch in the program can be created that stops the extraction of data from the site. This is a no matching products result code.

Another type of error condition occurs if the web site modifies the way results are presented. Extractor patterns can be developed to test for this circumstance and stop extraction of data from the site. Additionally, a branch can be created that stops the extraction of data from the site. This is a web site changed result code. In response to this result code, the data query and extraction computer 108 can generate a message for the operator such as a log entry or an e-mail message about the web site change.

E. Developing a Description of Data of Interest

FIGS. 6-36 illustrate the creation of a description of data of interest. In this example, a program to retrieve information about books for sale at an online bookstore will be developed.

1. Category Setup and Other Preliminaries

A web site of an online bookseller is selected, http://www.examplebookstore.com/ (FIG. 3, step 300). The web site is examined by the user of the computer 112 to determine the suitability of the bookstore for inclusion in the descriptions of data of interest 110. For example, if the data query and extraction server specializes in providing articles and comparison shopping for computers and computer technologies, the Example Bookstore may be ill suited for inclusion if the book selection does not include many computer books and magazines.

In this example, the Example Bookstore is selected for inclusion in the descriptions of data of interest 110. Next, it must be determined if the Example Bookstore's products fit into an existing category of products or information.

Figure 6:
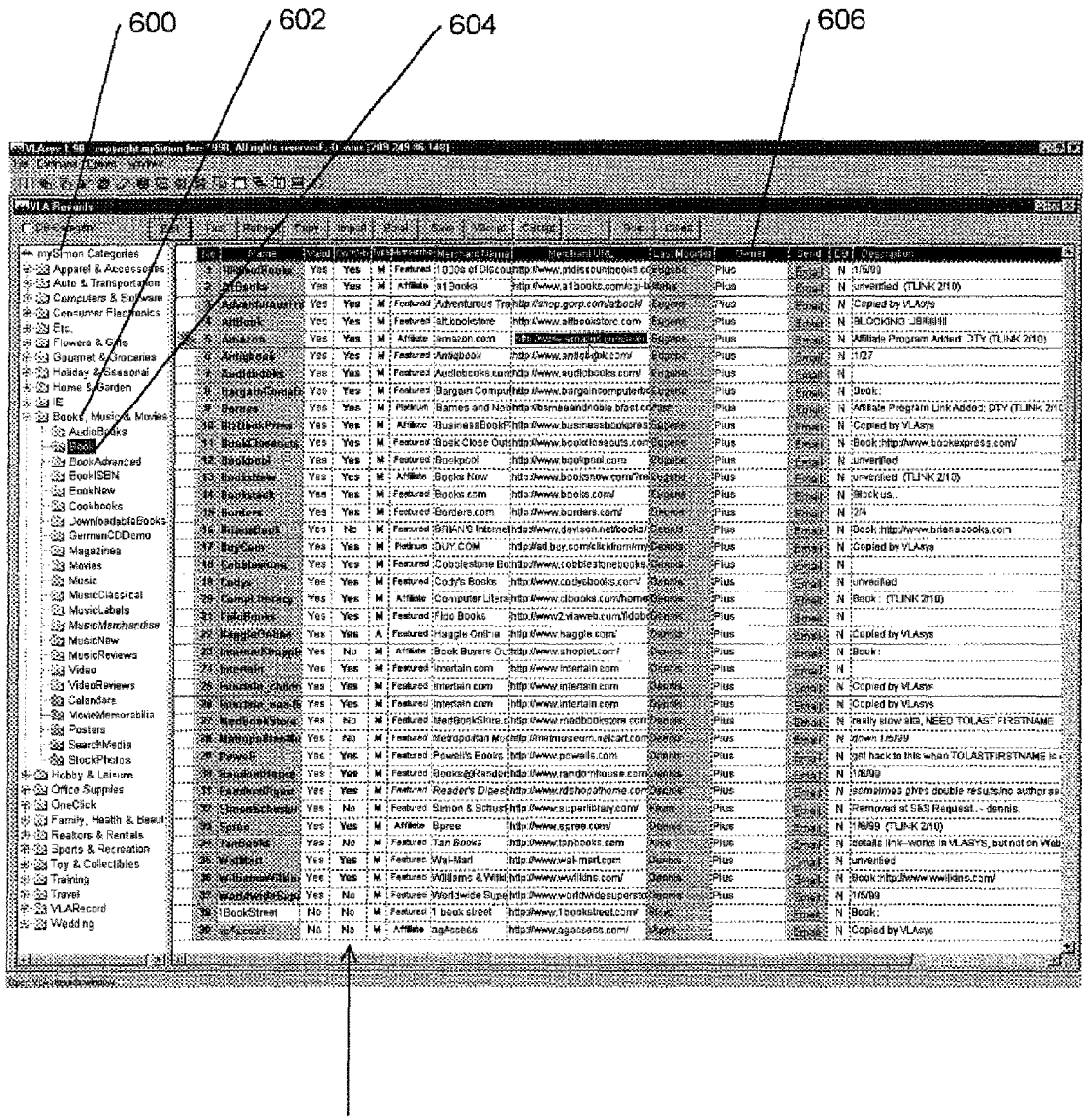

FIG. 6 shows an example view of a hierarchical collection of categories. The list of categories is shown in the GUI description creation program 114 using an outline style view 600. There is already a category for "Books, Music and Movies" 602. The category 602 has a sub-category for books 604. Inside the sub-category, there are already several descriptions of data of interest shown in list 606. Each description includes an entry in column 608 controlling whether or not the description is available to clients. e.g. the computer 100, using the data query and extraction computer 108.

Because a suitable category for the Example Bookstore exists, it is not necessary to go through steps 304-306. The process of developing a new description can begin at step 308.

Figure 7:
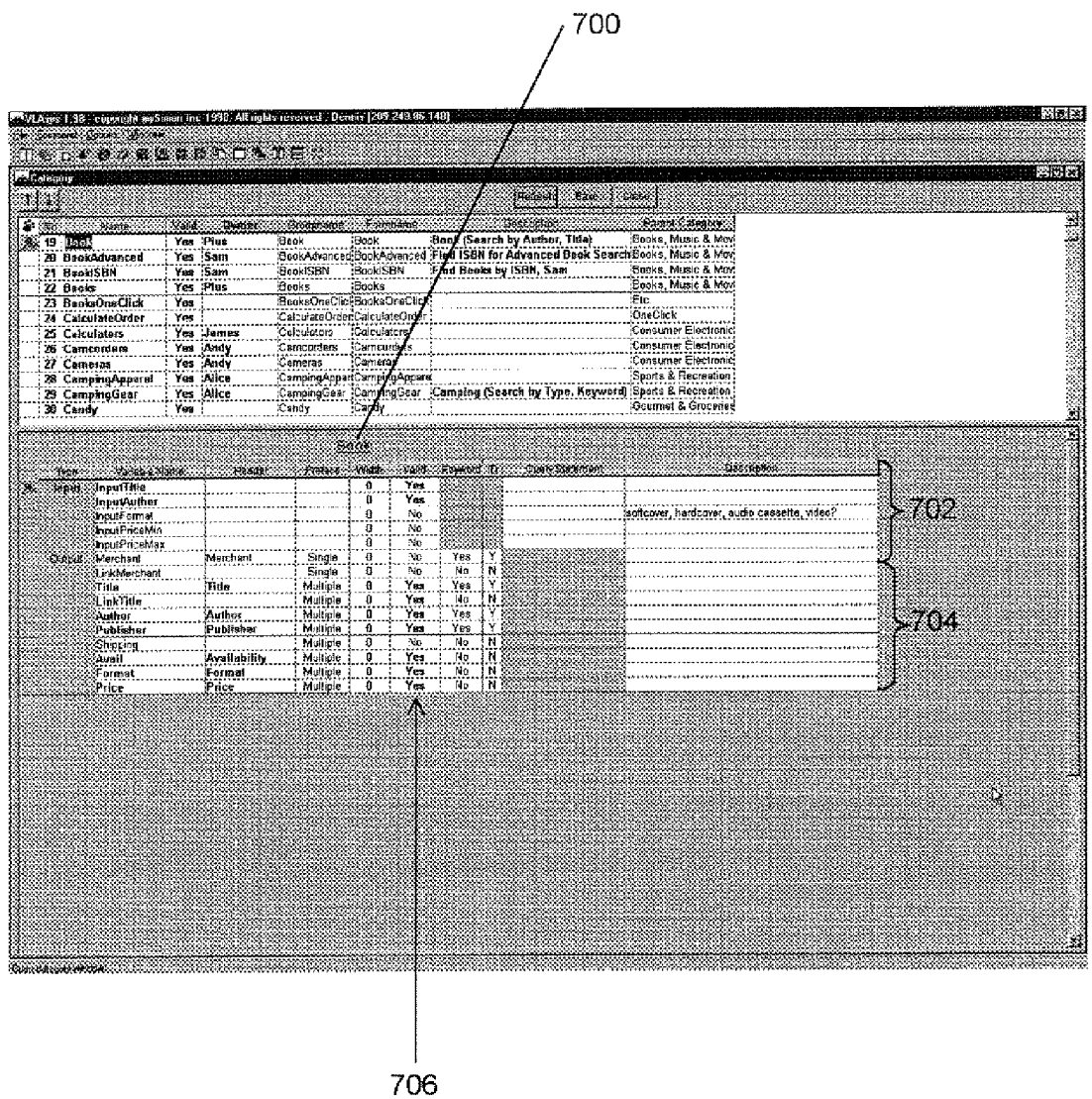

FIG. 7 illustrates a category description for the books sub-category. The category name "Books" is shown 700. Then the inputs 702 and outputs 704 are described. The inputs 702 correspond to the extraction parameters defined at step 304. The outputs 704 correspond to the portions of data of interest defined at step 306. In this embodiment, several inputs and outputs are defined that are not used by the descriptions as indicated by the value in column 706.

Figure 8:
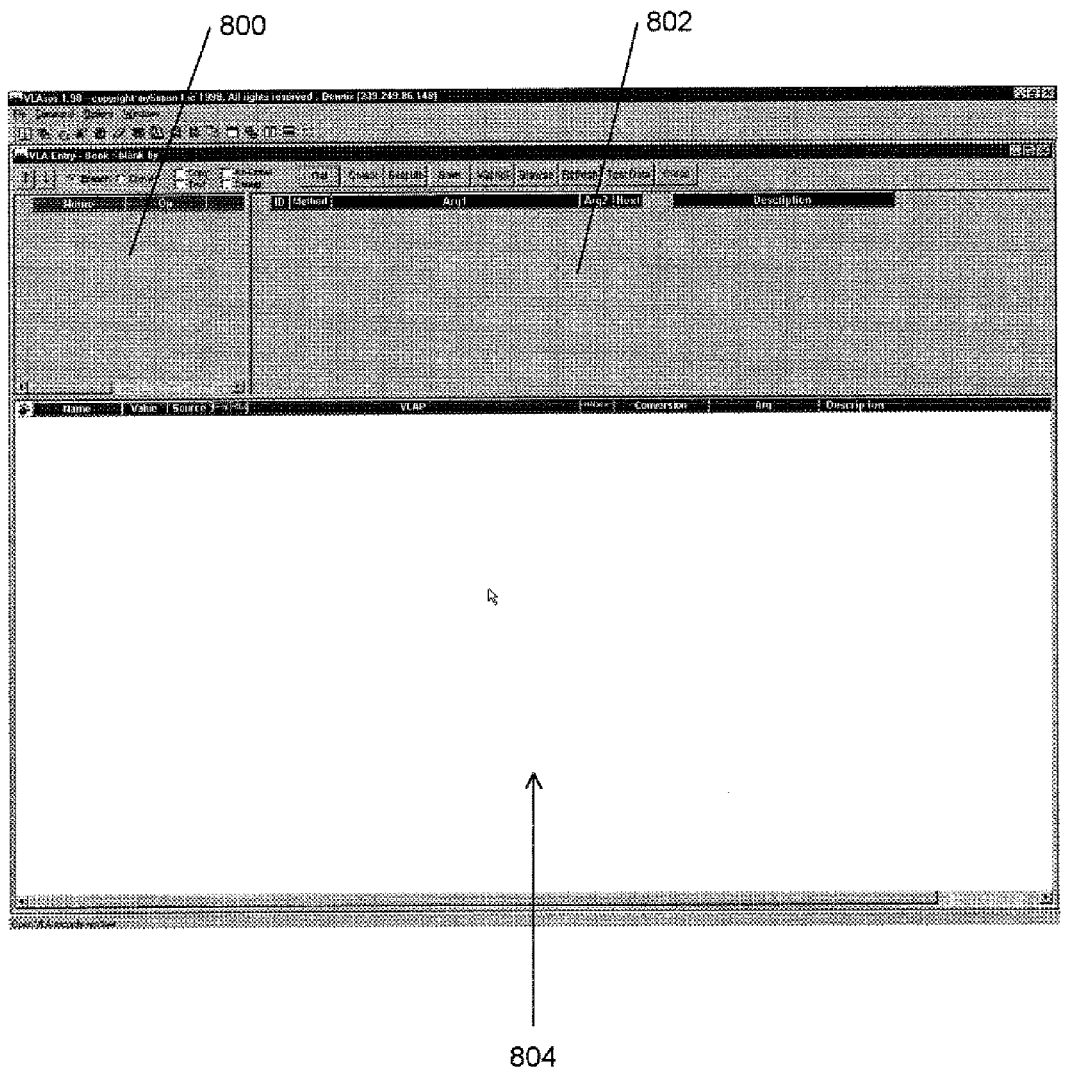

FIG. 8 illustrates a blank description of data of interest. There are three areas in the GUI description creation program 114 for defining instructions. The instructions are listed in the area 802. Sub-steps of the instructions are listed in area 804. Branching and pruning operations are listed in area 800. For each instruction in the description of data of interest, there will be one entry in area 802. For each instruction there will be one or more sub-steps visible in area 804 when the corresponding instruction is being edited and defined. Similarly, there will be one or more branch and/or prune instructions displayed in area 800 when an instruction is being edited and defined.

2. A Description of Data of Interest

At this point, no data has not been extracted (FIG. 4, step 400). In this example, the description of data of interest will only extract book titles. Later in this example, the data extracted will be extended to include the popularity of the title.

Figure 9:
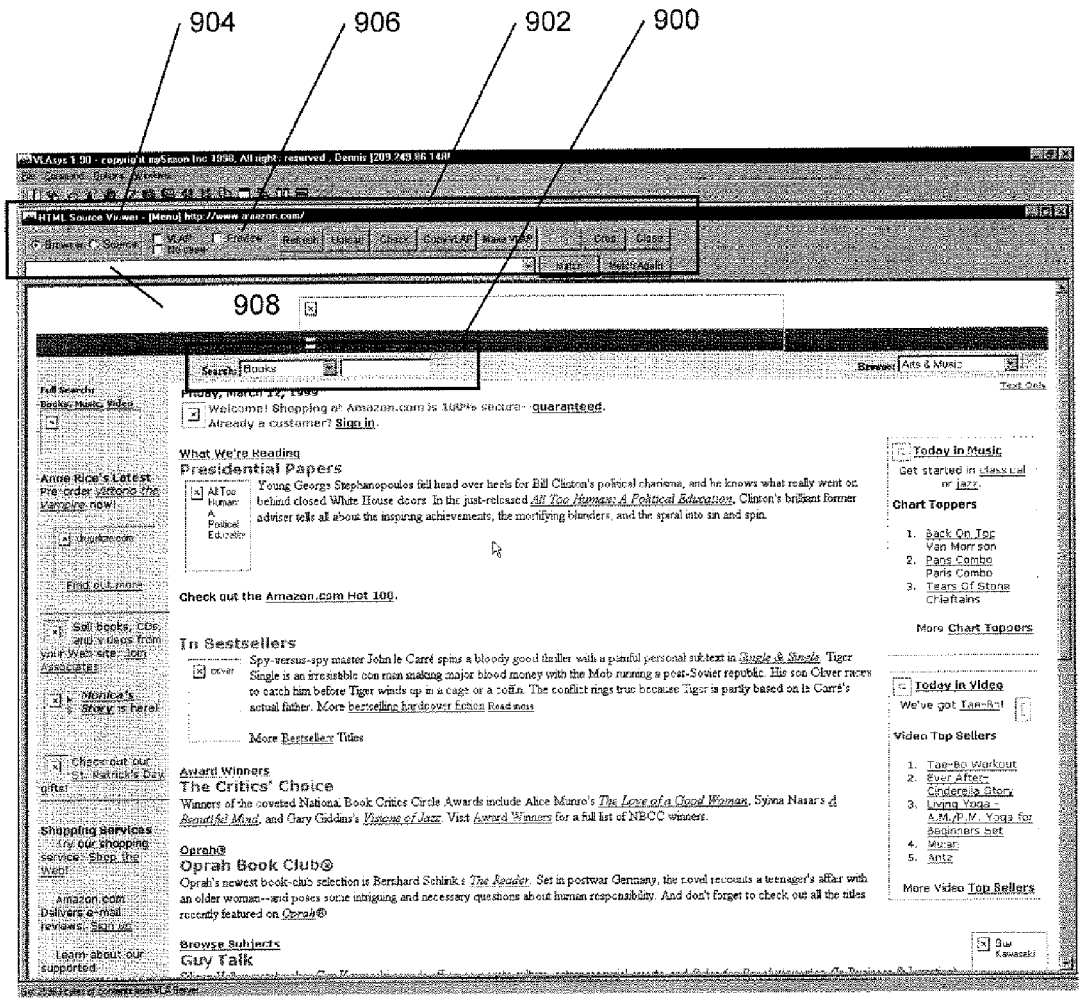

FIG. 9 shows the home page of the Example Bookstore. The home page is being viewed using an integrated browser built into the GUI description creation program 114. There are a number of tools in area 902 of the GUI description creation program 114 for developing extractor patterns.

In this example, the home page includes a search form 900 that allows books to be located at the Example Bookstore. The tools in area 902 include a control 904 for toggling between a view of the rendered HTML and the HTML source, a control 906 for displaying a preview window of the matching HTML and other controls for testing extractor patterns. The tools in area 902 also include an extractor pattern development area 908. The extractor pattern development area 908 allows the pull-down selection of several predefined extractor patterns, as well as, the interactive development of the extractor pattern. At this point, the user of the computer 112 decides how to retrieve information on matching titles from the Example Bookstore. In this example, the search will be done by using the form 900.

Figure 10:
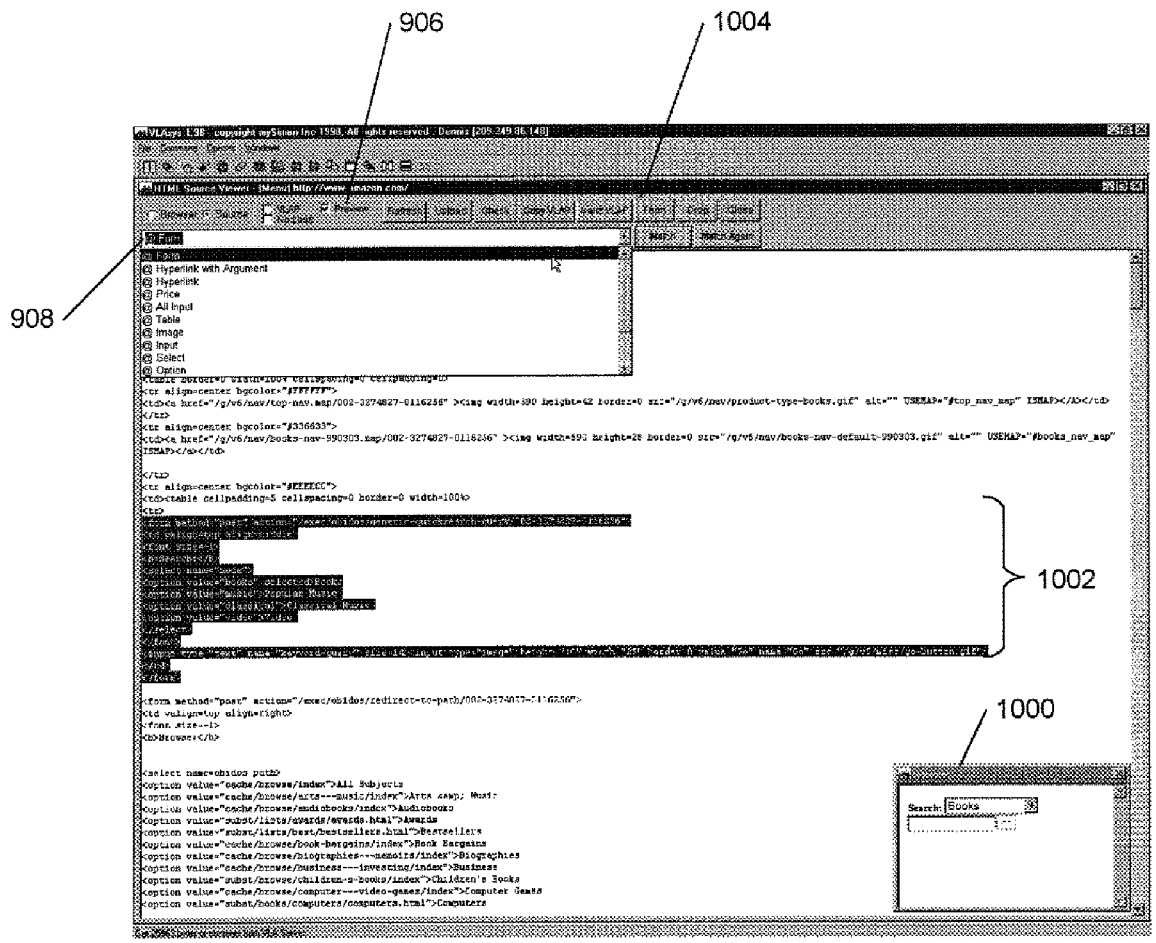

FIG. 10 shows an example of the types of predefined extractor patterns available for use in the extractor pattern development area 908. In FIG. 10, the preview control 906 has been selected. A preview window 1000 shows the matching extractor pattern as rendered HTML. The matching extractor pattern is highlighted in the source view as indicated at 1002. The integrated browser also includes a form control 1004. The form control 1004 can automatically make an instruction in the description of data of interest corresponding to a form.

Figure 11:
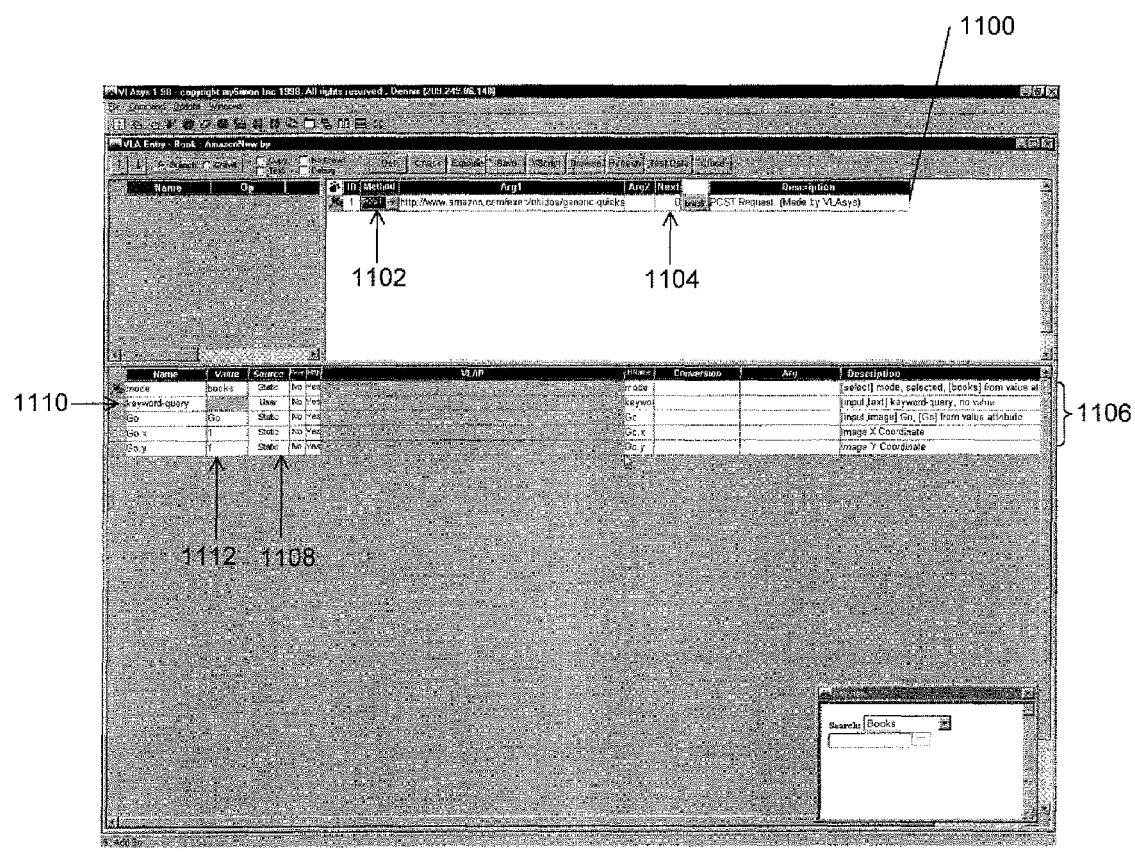

FIG. 11 shows the result when the user of the computer 112 signals on the form control 1004. The instruction created by the form control 1004 is the instruction 1100. The instruction 1100 is a post instruction as indicated in the method pull-down list 1102. The list of predefined instructions is shown in Table 1. Each instruction takes one or more arguments and includes a value specifying the next step 1104 in the sequence of instructions.

As additional instructions are added, the values of the next step 1104 for the instructions can be changed to sequence the instructions. The post instruction 1100 has several sub-steps 1106. For the post instruction, the sub-steps correspond to the different inputs of the form. Of the sub-steps, only sub-step 1110, the input named keyword query on the form, is used to allow the title input to be used. In column 1108, the other sub-steps are set to be static values. This means that those values will not be supplied by a user. Notice that the value column 1112 allows predefined values extracted from the web page to be used for the static inputs. The name for sub-step 1110 can be changed to that of one of the inputs 702 to create a correspondence between the input and the keyword query field of the search form on the Example Bookstores web site.

Figure 12:
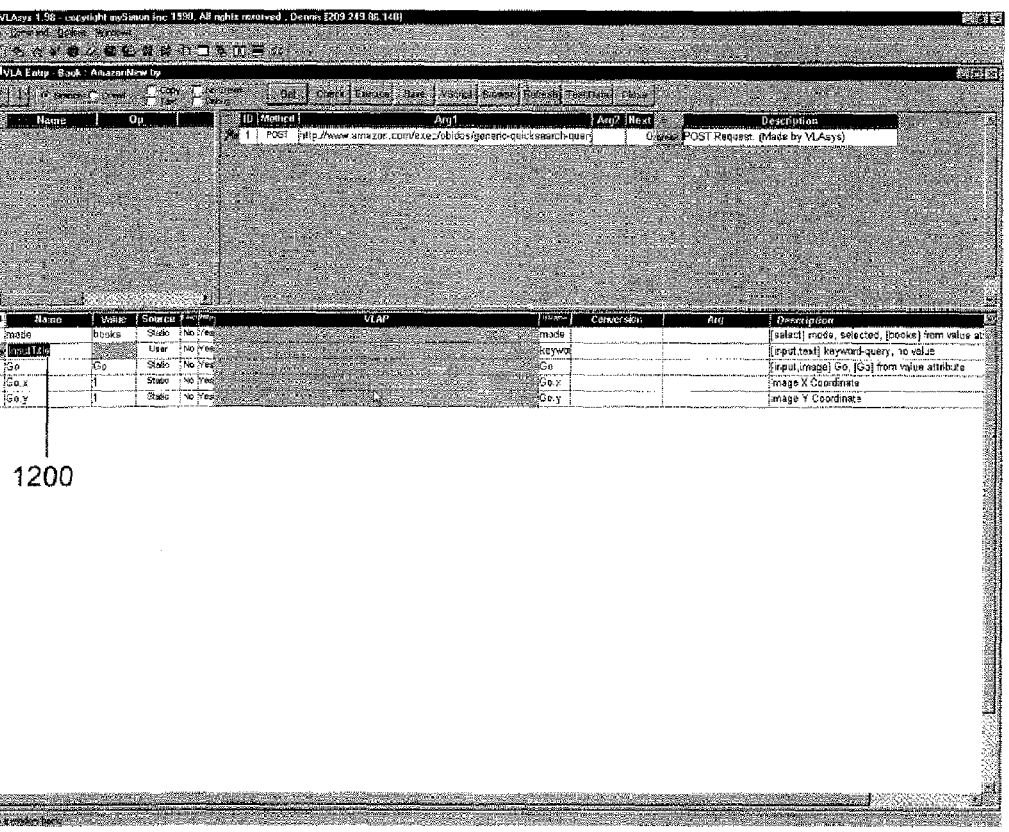

This change is shown in FIG. 12 where the name for the sub-step 1110 has been changed to input title as shown at 1200. This associates the extraction parameter value given for the category input "InputTitle" with the "keyword-query" input of the Example Bookstore search form.

Figure 13:
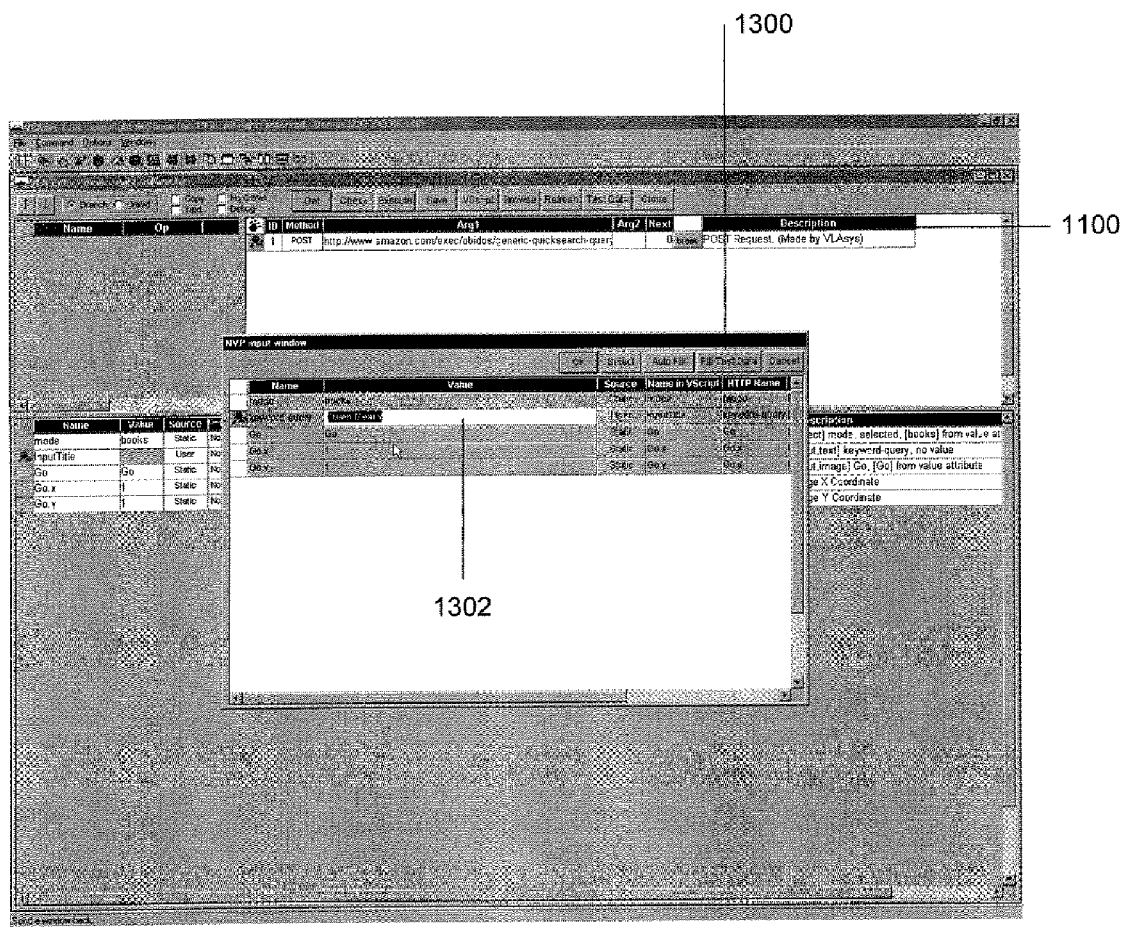

FIG. 13 shows the testing of the instruction 1100 with user input. The window 1300 is displayed with the sub-steps of instruction 1100 displayed and an input field 1302 where the user can provide a value for the input title extraction parameter.

Figure 14:
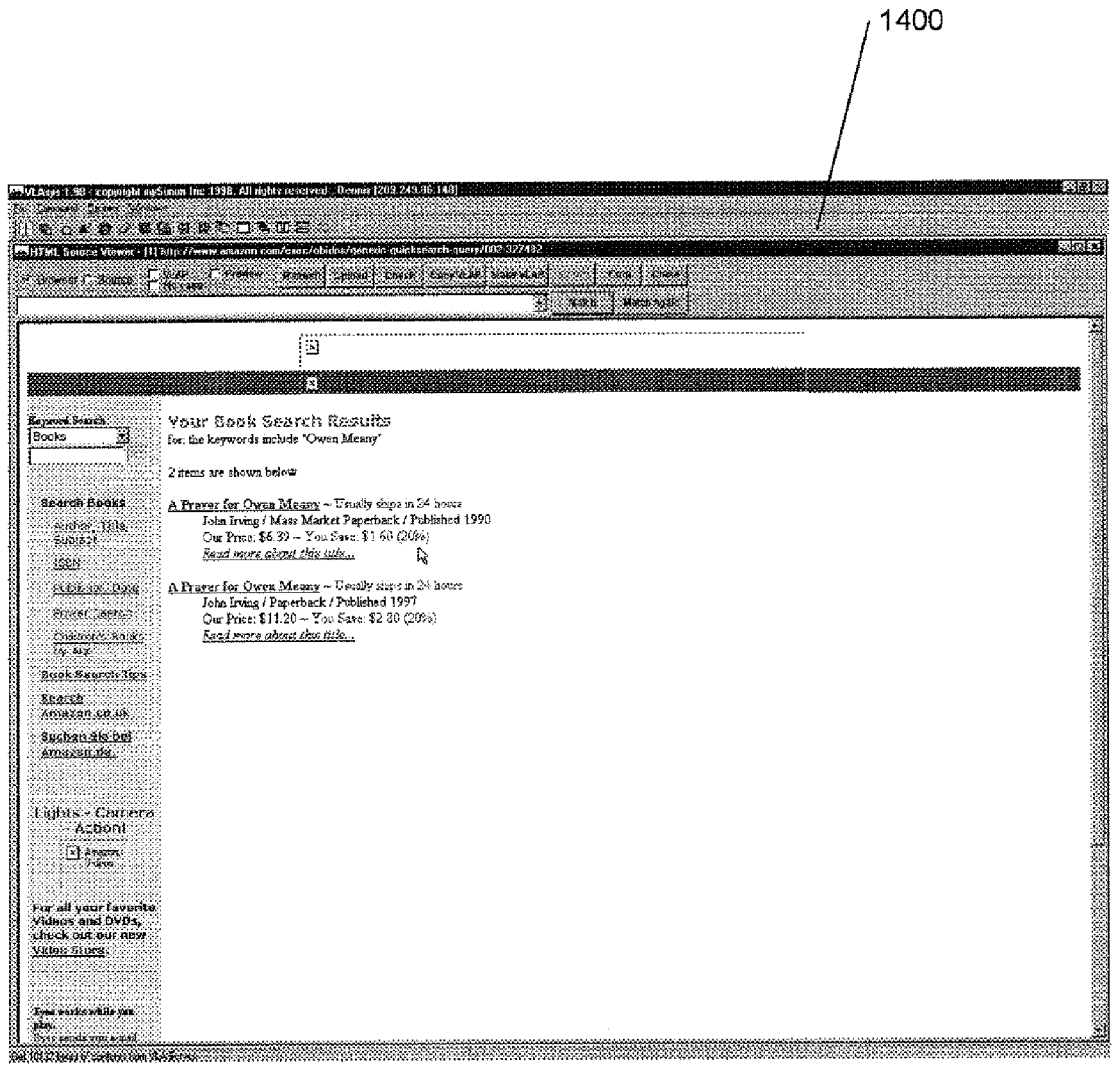

The result of executing the instruction is the web page shown in FIG. 14. FIG. 14 shows the integrated browser window 1400 with the results from the input title value "Owen Meany". The user can proceed to develop the description of data of interest further by extracting information from the buffer generated by the post instruction, e.g. the contents of the web page shown in the integrated browser window 1400.

Figure 15:
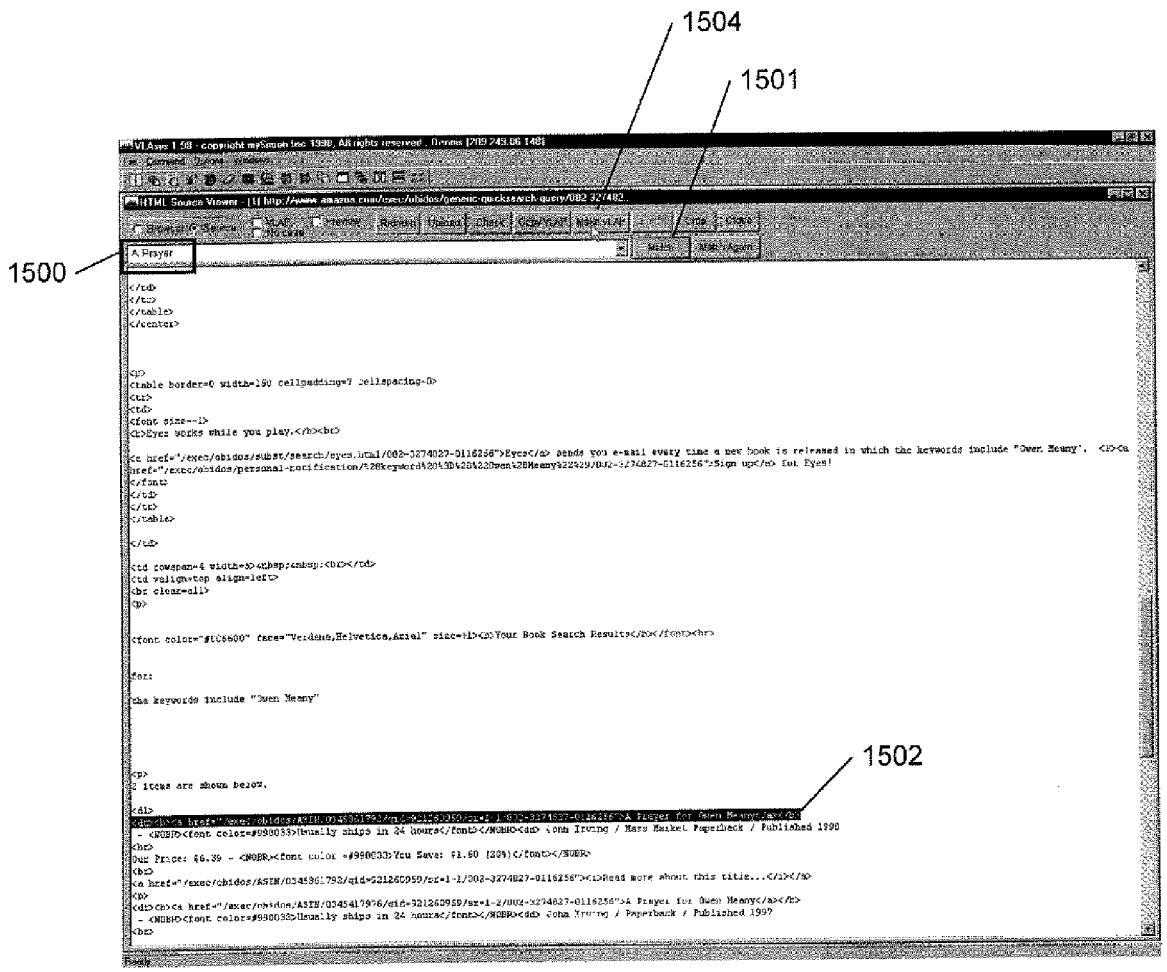

FIG. 15 shows the user developing an extractor pattern by first identifying a portion of the data of interest. Here the user has filled in a portion of one of the titles "A Prayer" at 1500 in the extractor pattern development area. Upon signaling on the match control 1501 the extractor pattern will be located in the web page. The pattern has been found and a longer string 1502 has been selected. The user will use the longer string to generate an extractor pattern to match titles. The user signals on the make extractor pattern control 1504 to refine the extractor pattern further.

Figure 16:
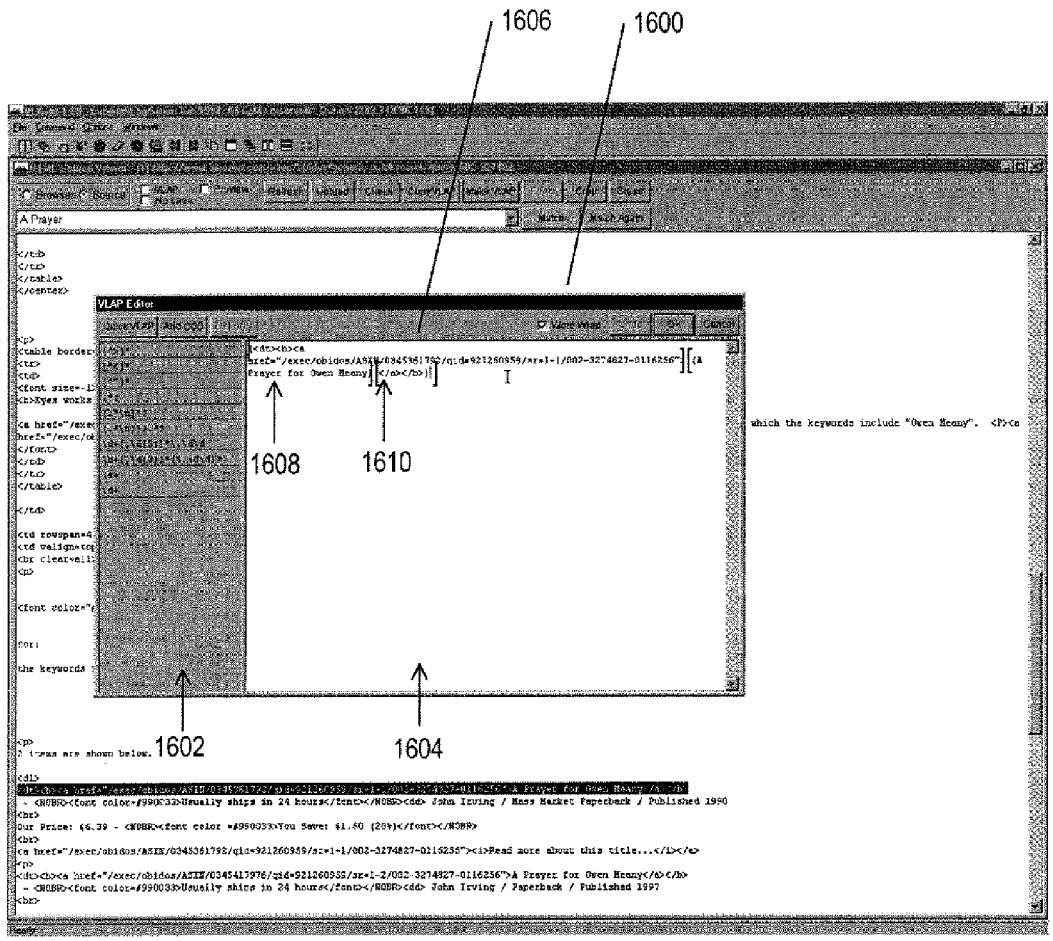

FIG. 16 shows an extractor pattern development window 1600. The extractor pattern development window 1600 includes a list of common extractor patterns 1602 and an extractor pattern development pane 1604. In this embodiment, the extractor patterns are described by pre-condition, portion of data of interest, and post-condition regular expressions. The pre-condition regular expression is surrounded by a first set of parentheses, the matching condition by a second set of parentheses, and the post-condition by a third set of parentheses. The user in FIG. 16 has developed a preliminary pre-condition regular expression 1606, a preliminary portion of data of interest regular expression 1608, and a preliminary post-condition regular expression 1610. If this extractor pattern is tested it will fail to match the second result entry of "A Prayer for Owen Meany" on the web site as shown in FIG. 14 because the link information is different inside the HREF attribute of the <A> tag for the second book. Further, the extractor pattern would fail to match books not titled "A Prayer for Owen Meany" that still contained "Owen" and "Meany" in the title.

Figure 17:
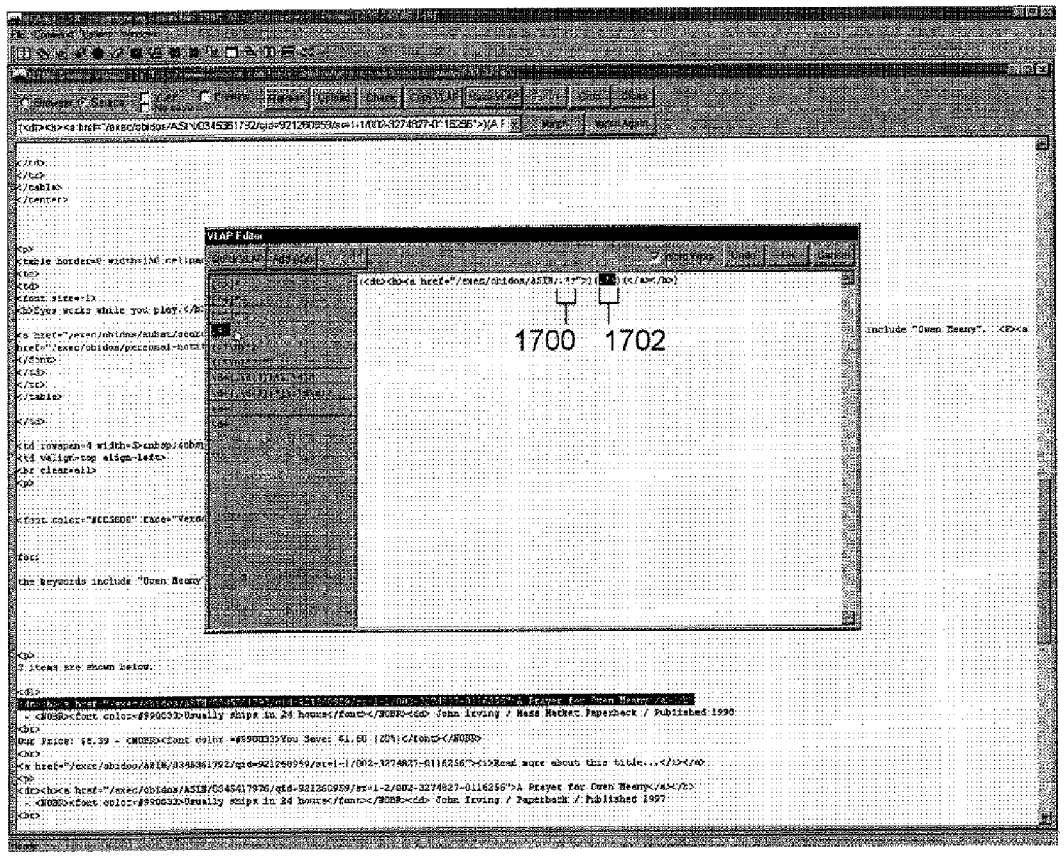

In FIG. 17, the extractor pattern is refined. Here many of the portions of the extractor pattern that are unique to the current title have been replaced with regular expressions that will match other titles. For example, at 1700 the specific URL of the book has been replaced with a wildcard that matches many similar URL's. Similarly, at 1702 the specific title "A Prayer for Owen Meany" has been replaced with a regular expression that matches other titles.

Figure 18:
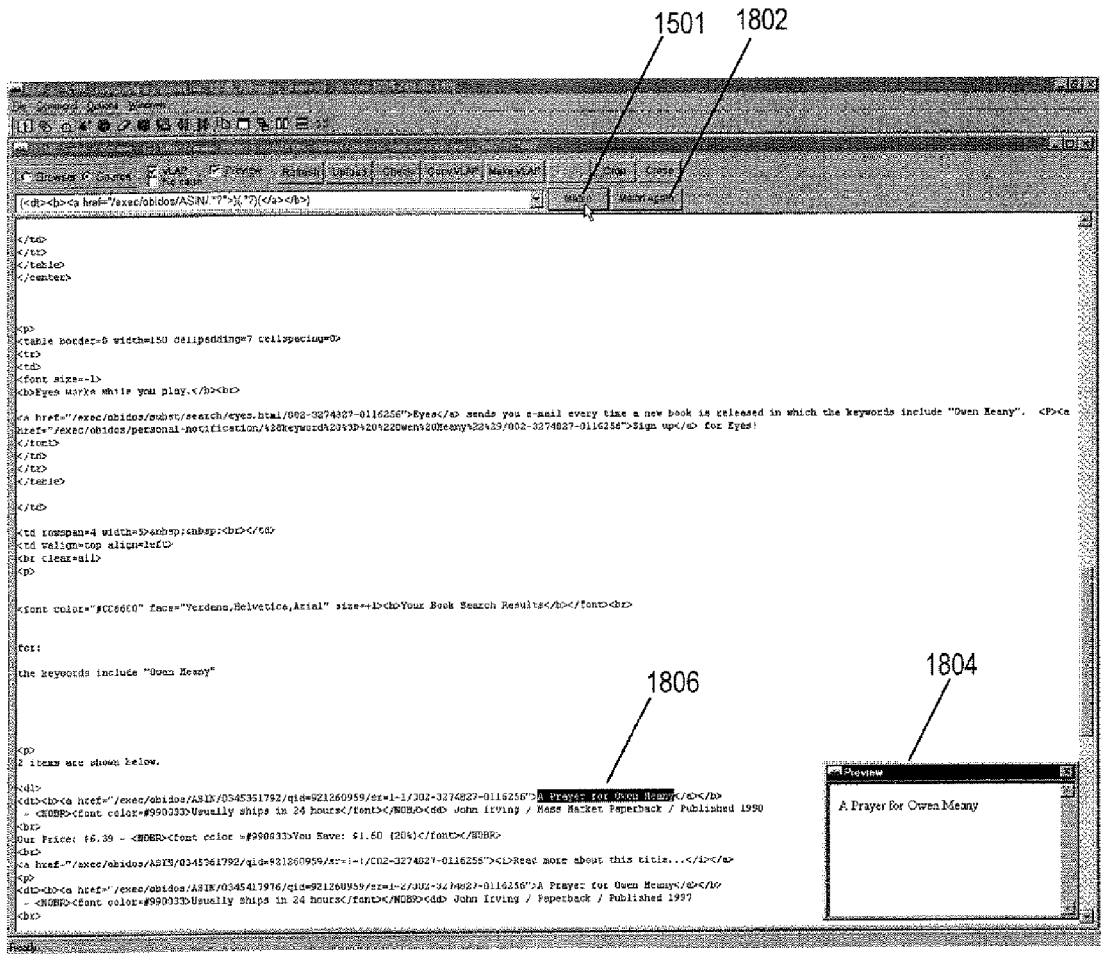

FIG. 18 shows the refined extractor pattern being tested using the match control 1501 and the match again control 1802. The preview window 1804 is shown so that the portion of data of interest of the extractor pattern shown as rendered HTML. Additionally, the matching HTML source is shown highlighted 1806. Now that the extractor pattern has been developed, it can be used with an instruction to extract information from the Example Bookstore web site.

Figure 19:
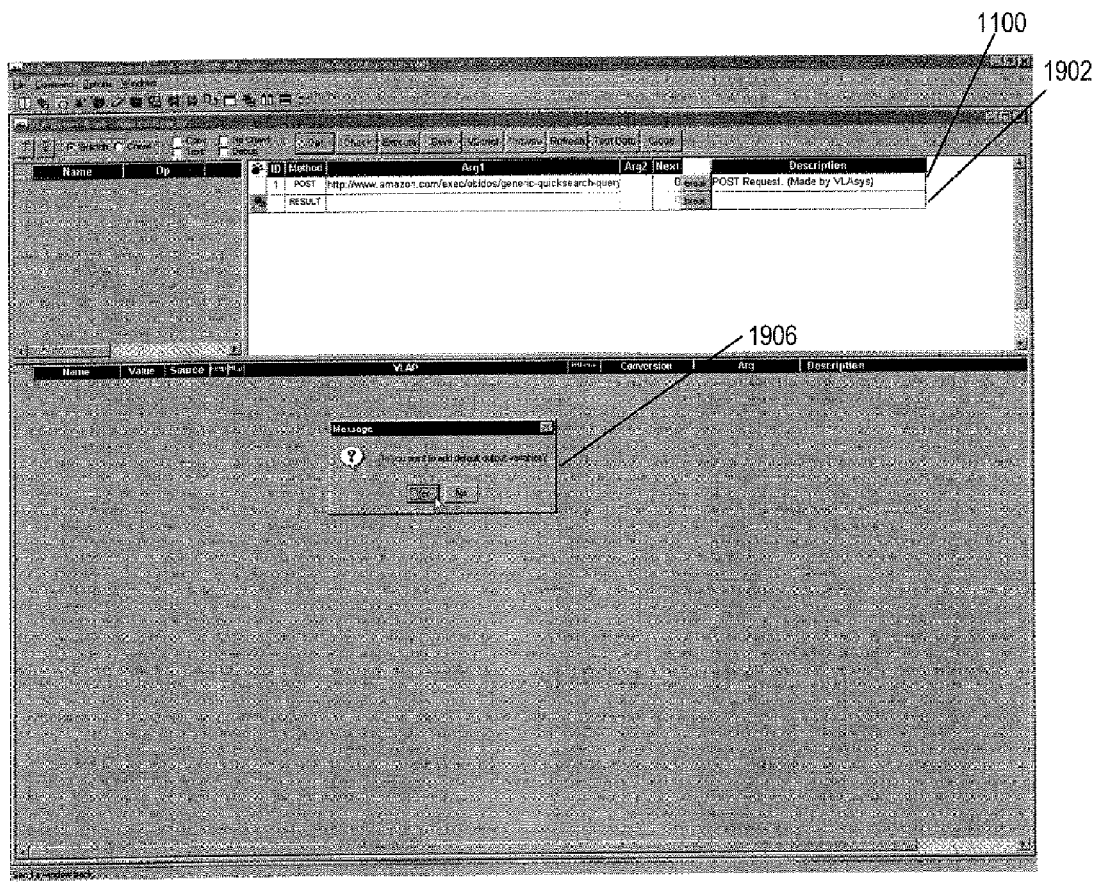

FIG. 19 shows the new extractor pattern being added to an instruction. A new result instruction 1902 has been added. The result instruction is one of the predetermined instructions. The result instruction is used to extract stored information from the buffer and variables into the outputs defined in the category. When added to a description of data of interest, a dialog box 1906 is presented by default that allows the default outputs 704 for the category to be added as sub-steps to the result instruction.

Figure 20:
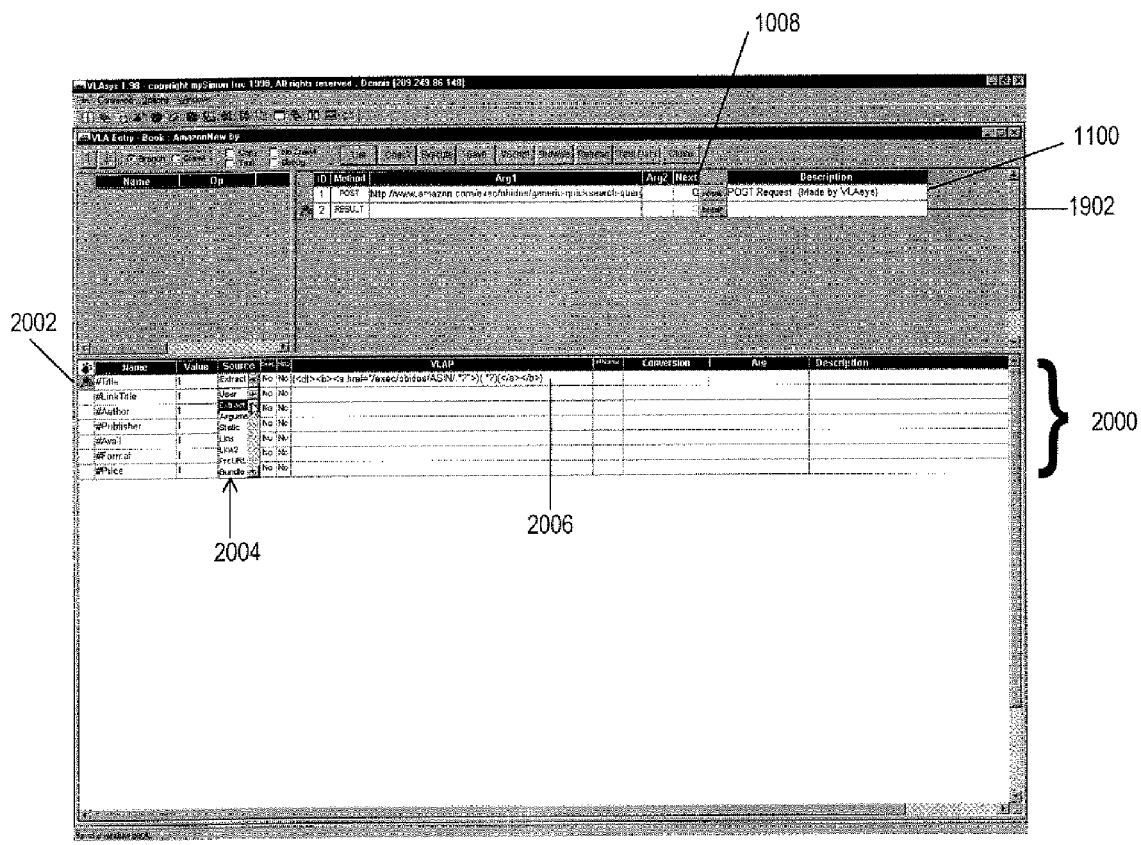

FIG. 20 shows the result of selecting "Yes" to the dialog box 1906, the creation of sub-steps 2000. If not all of the outputs are being used, as in this example, then it may be desirable to select "No" in response to the dialog box 1906 and simply add sub-steps for the used output variables. The sub-steps 2000 correspond to the outputs 704. Since only the title is being extracted, the source for the title is selected as extract from the pull-down list 2004. The extractor pattern that was developed is associated with that output in field 2006. The next instruction value for the instruction 1100 is changed to two so that the flow of the description of data interest is first to instruction 1100 and then to instruction 1902.

Figure 21:
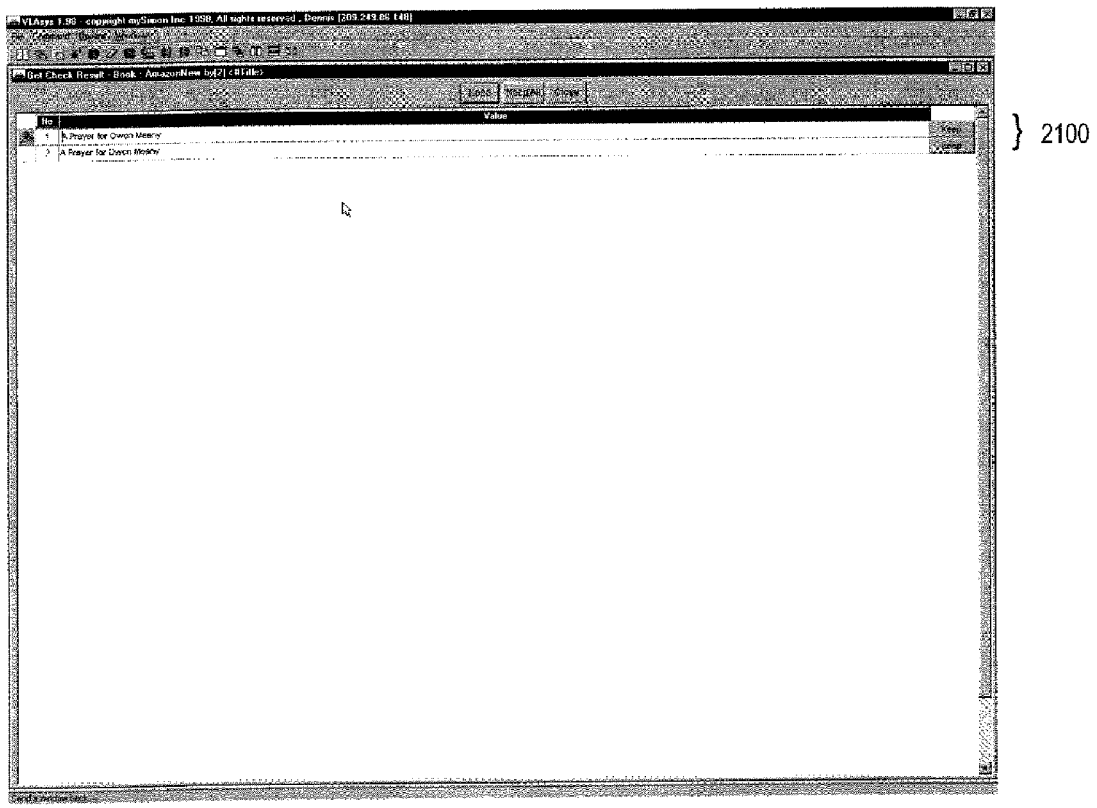

FIG. 21 shows the results of the program with the sample extraction parameter "Owen Meany" used. The result is the data of interest 2100. Each item in the data of interest 2100 has only one portion, the title.

Figure 22:
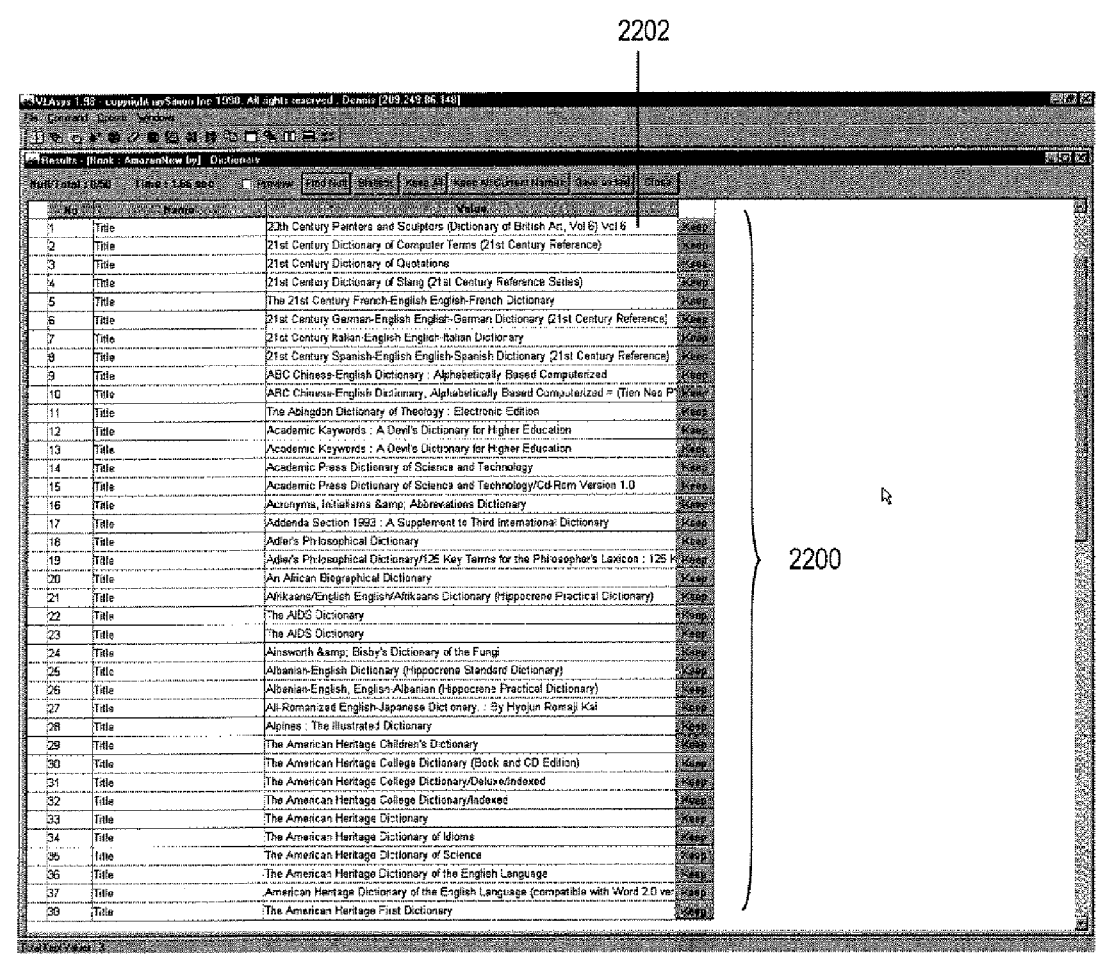

FIG. 22 shows the same description of data of interest being tested with the word "Dictionary" as the extraction parameter. The result is the data of interest 2200, including an item of interest 2202, a dictionary of British art with 20th century painters and sculptors.

3. Extracting Additional Portions of Data of Interest

Returning to FIG. 14, each of the search results from the Example Bookstore includes information about the author, the year published and the price, along with a link to other information. One of the other pieces of information not present on the search results is how popular a particular book is. To get that information, a user of the computer 100 would normally have to signal on the links for each of the titles and locate the sales rank. In extending the description of data of interest, a description that can retrieve the sales rank and combine it with the title information to present a list of titles and their sales popularity will be developed.

Figure 23:
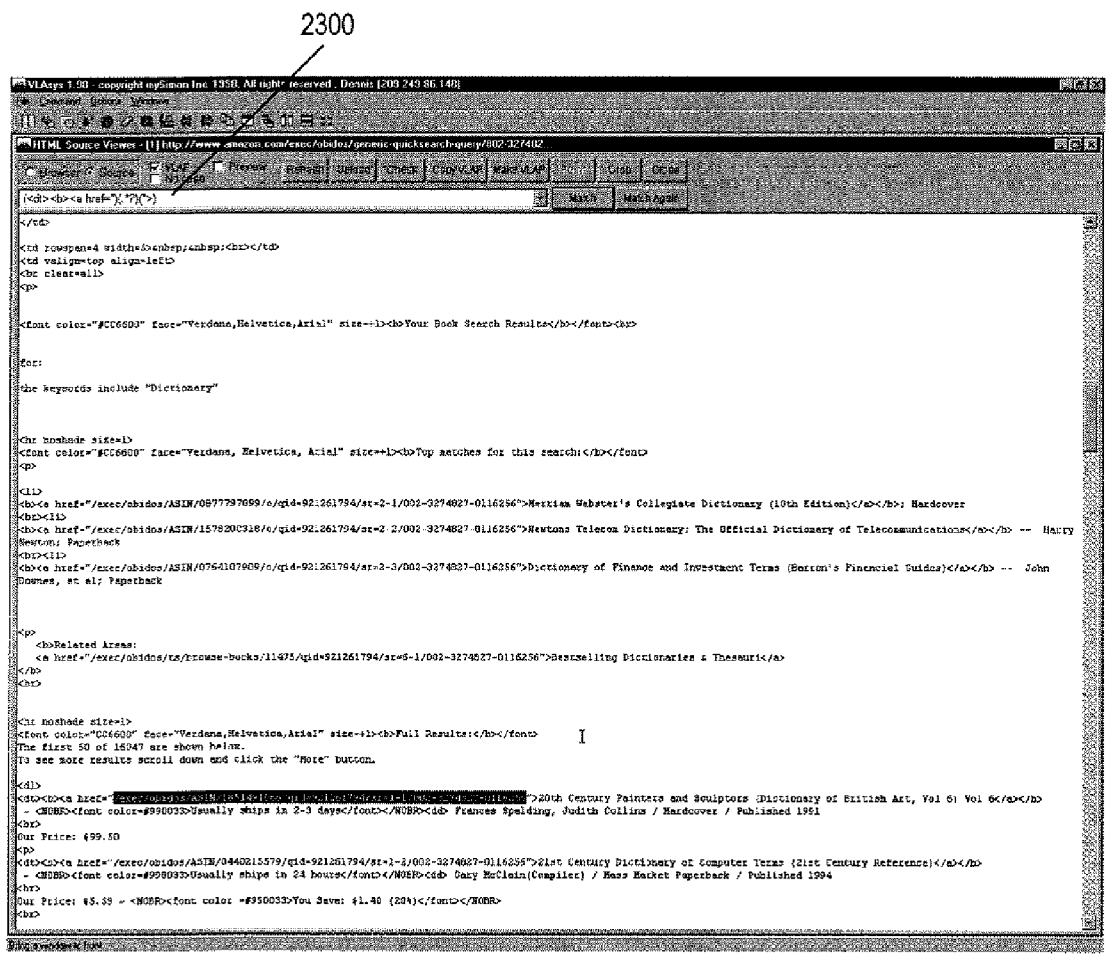

FIG. 23 shows the development of an extractor pattern for the links that lead to the sales rank information. The extraction pattern 2300 matches only the links on the results page that lead to further information about books.

Figure 24:
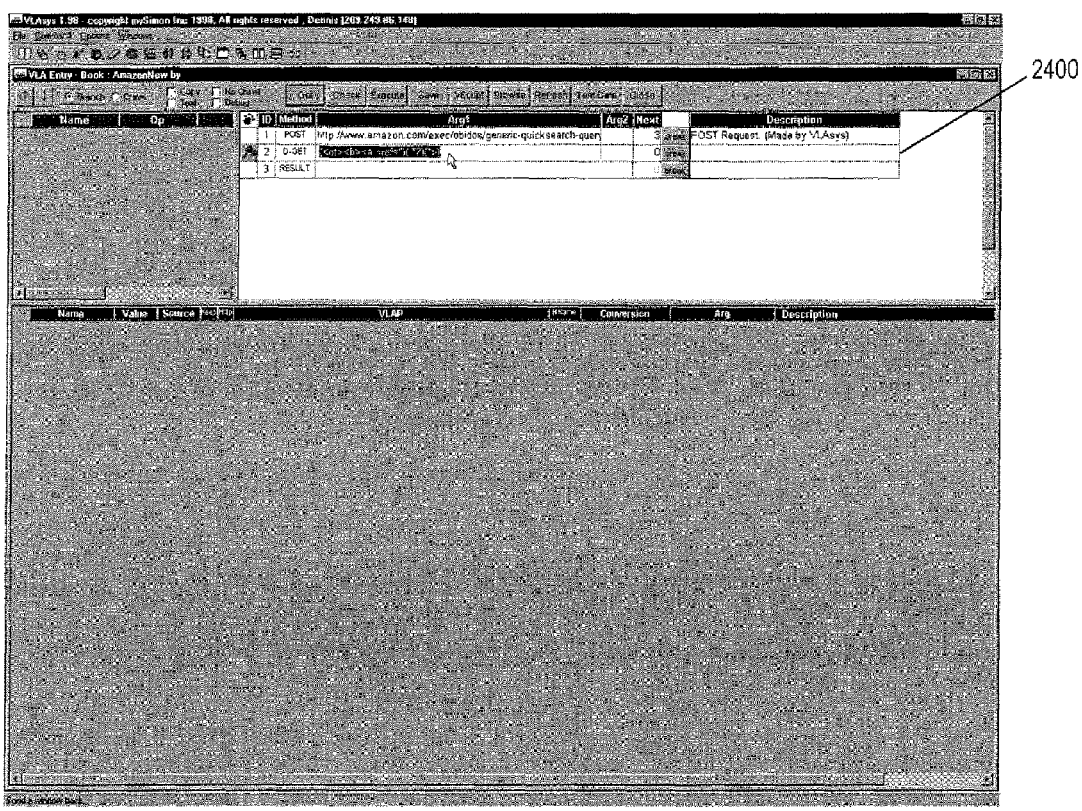

In FIG. 24, a D-get instruction 2400 is added to the description of data of interest. The D-get instruction accepts an extractor pattern where the portion of data of interest matched by the extractor pattern is a URL or relative URL.

Figure 25:
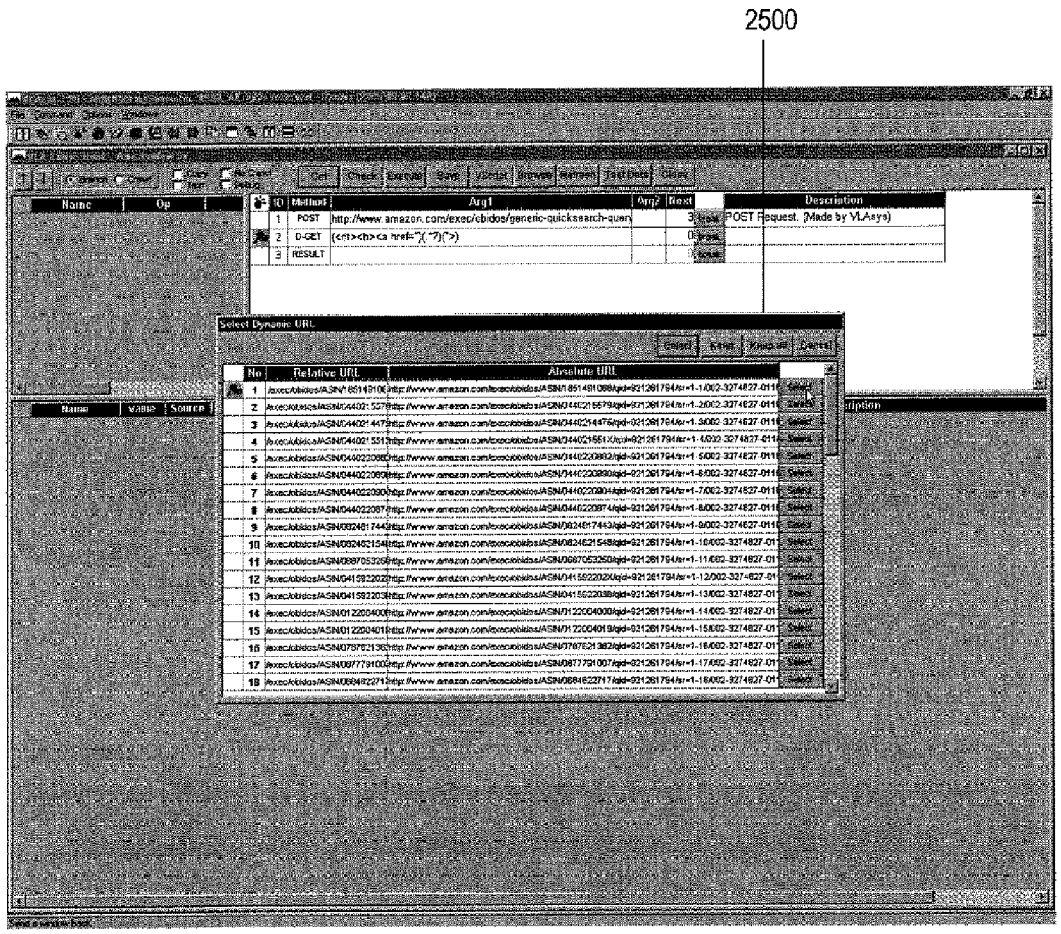

FIG. 25 shows the results of the D-get instruction, a window 2500 of matching URLs and the corresponding absolute URLs deduced based on the web site address.

Each of the web pages corresponding to a URL listed in the window 2500 will be retrieved into a different buffer. Further execution of the description of data of interest will occur with each instruction operating on all of the buffers.

Figure 26:
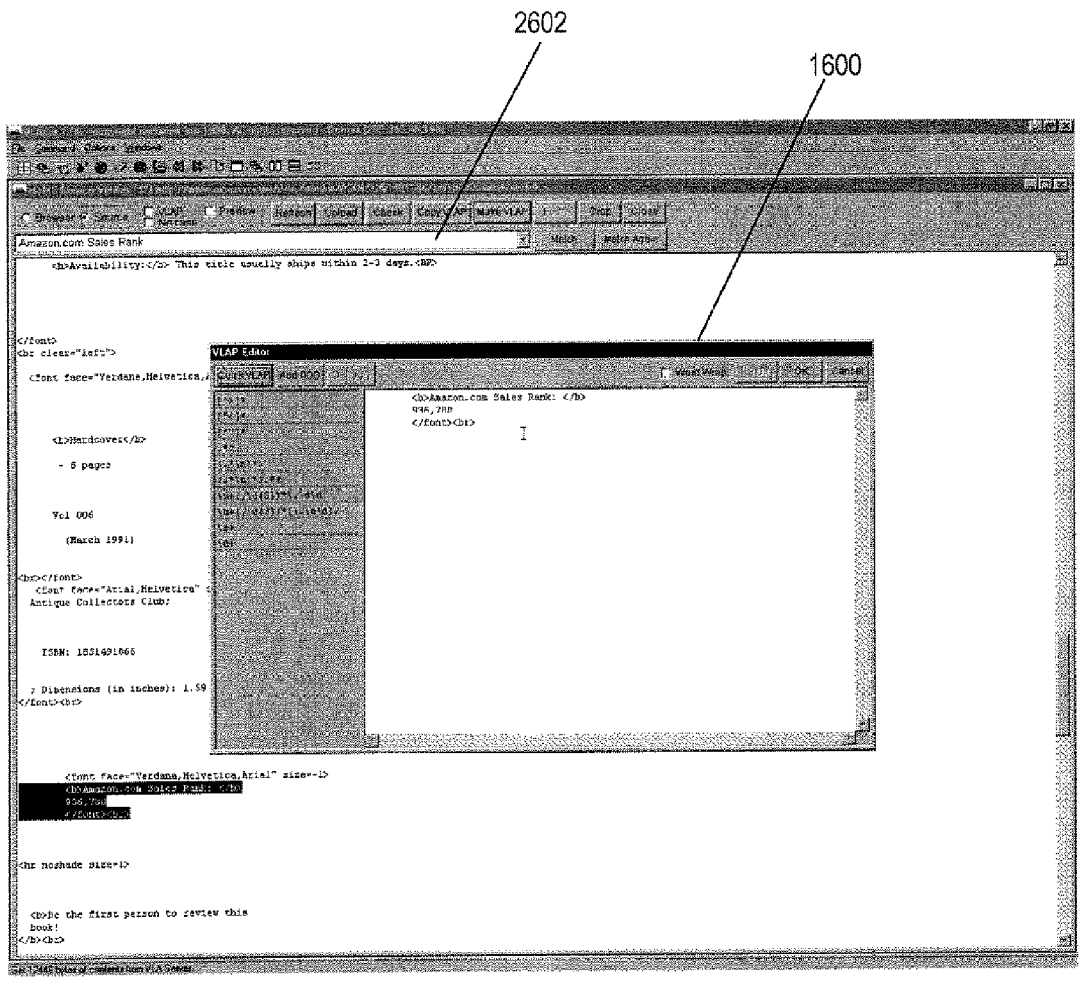

FIG. 26 shows the web page linked to by one of the URLs and the development of an extractor pattern 2602 using the extractor pattern development window 1600.

Figure 27:
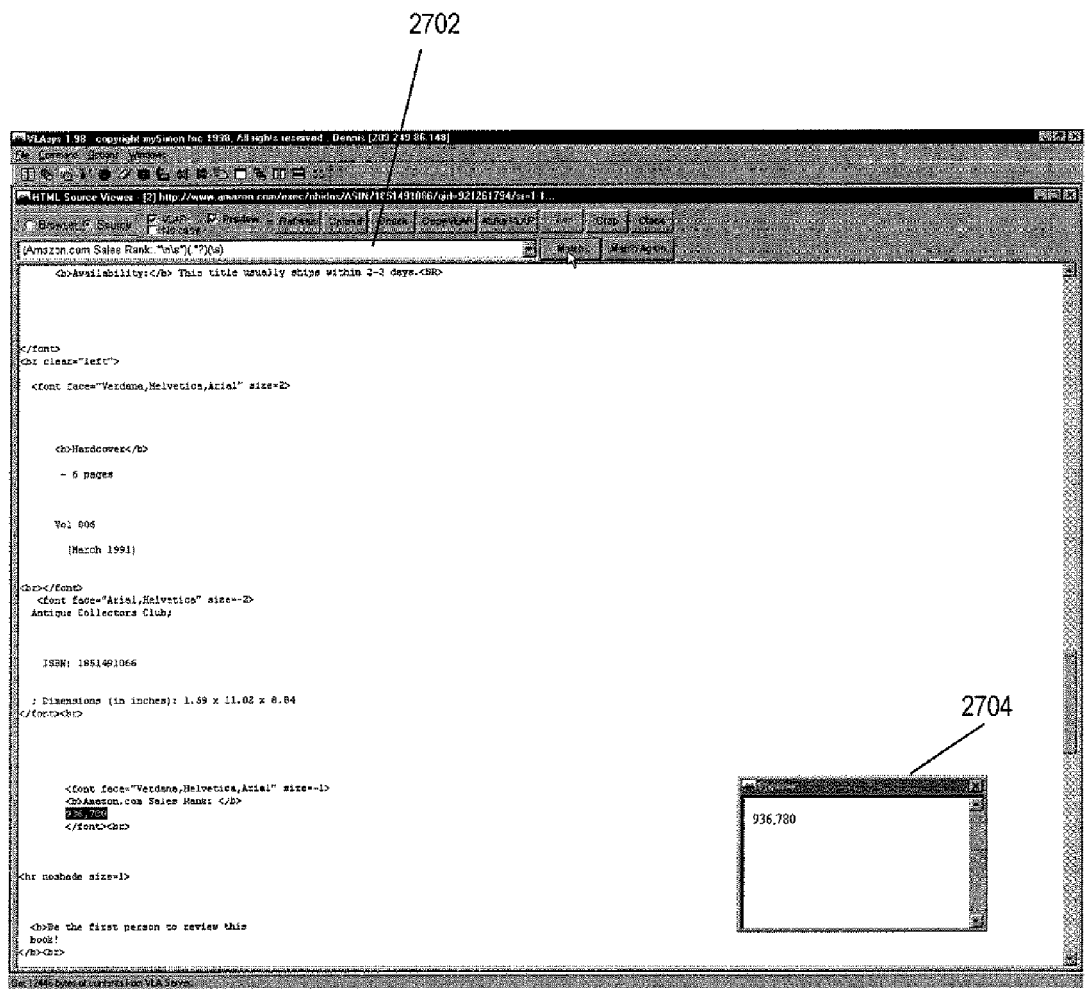

FIG. 27 shows the completed extractor pattern 2702 along with the preview window 2704 showing a matching result for the extractor pattern 2702.

Figure 28:
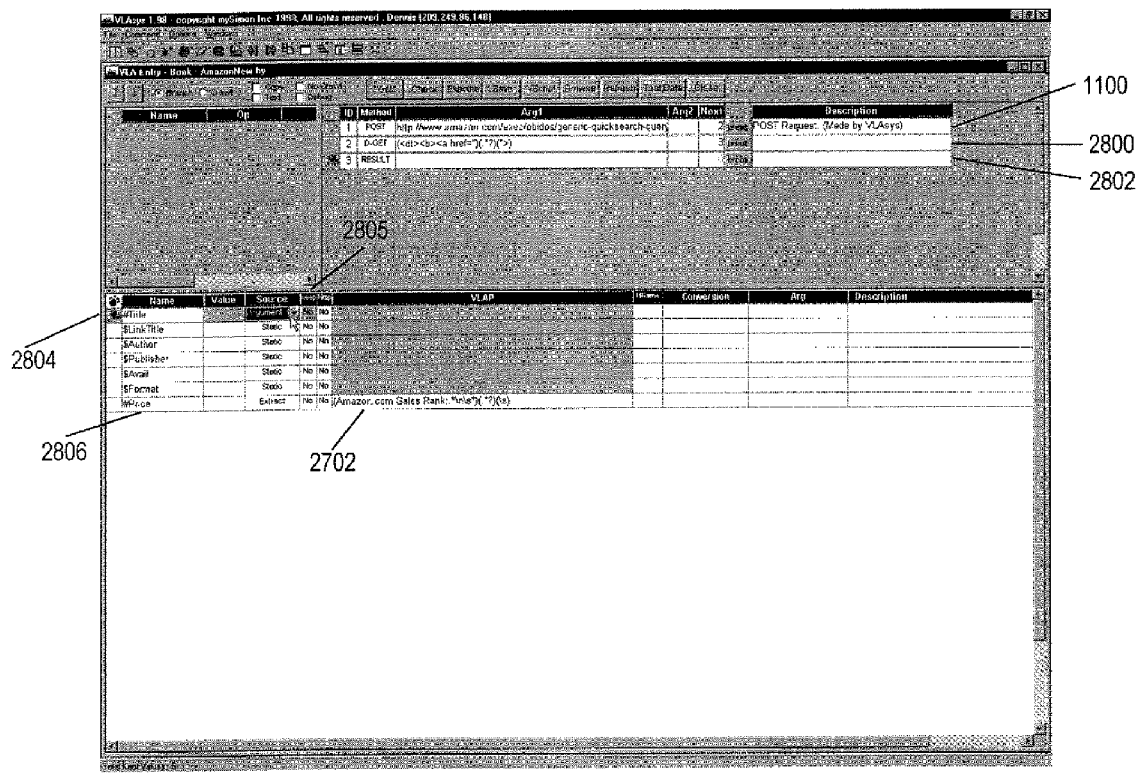

FIG. 28 shows the sequencing of the D-get instruction 2800 to develop a description of data of interest that retrieves the sales rank. In FIG. 28, the extractor pattern 2702 is used as part of sub-step 2806 of the result instruction 2802 to extract the sales information into an output parameter for storing the sales rank. The sub-step 2804 of the result instruction 2802 assigns previously stored title information to the title output parameter as indicated by the selection of argument as the source 2805 of the title information. Thus, the D-get instruction 2800 should have a sub-step that extracts the titles from the buffer resulting from the post instruction 1100.

Figure 29:
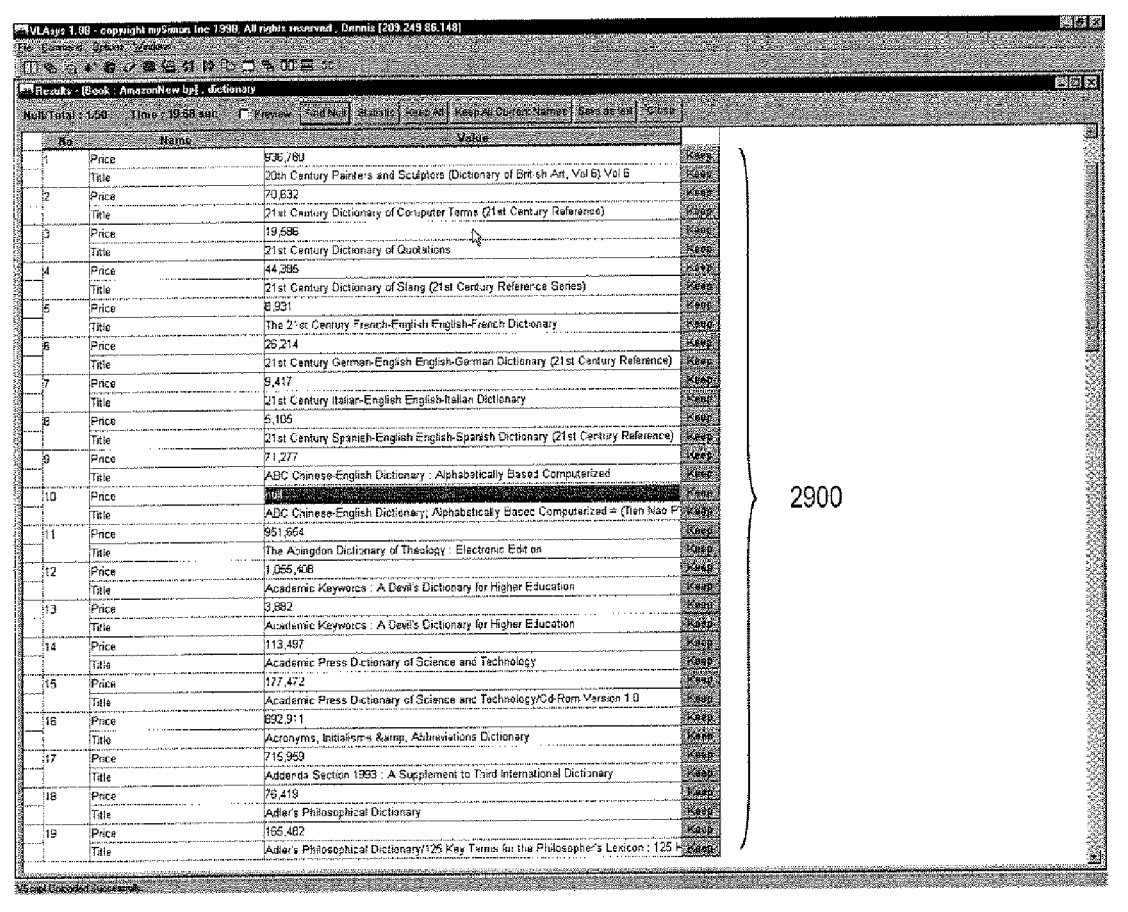

FIG. 29 shows the result when the new description is used with the title extraction parameter of "Dictionary". The result is the data of interest 2900 including both the title and, where available, the sales rank for that title.

4. Dissecting Web Pages

Sometimes web pages, such as the web page 500, include the repeated information 504, such as top selections, or hot picks. The presence of the repeated information 504 can cause redundant extraction. It can also complicate the development of extractor patterns. Further, sometimes similar formatting is used in several places throughout a web page making it difficult to extract the information of interest without first processing the web page.

Sometimes, the information on a web page is comprised of units. A unit is a logically similar portion of an HTML document. For example, FIG. 14 has two units, one for each book and the units all have similar information about the book: title, author, price year published, and a link to more information. Similarly, the results page for the value "Dictionary" produces over fifty units one for each book with dictionary in the title.

Figure 30:
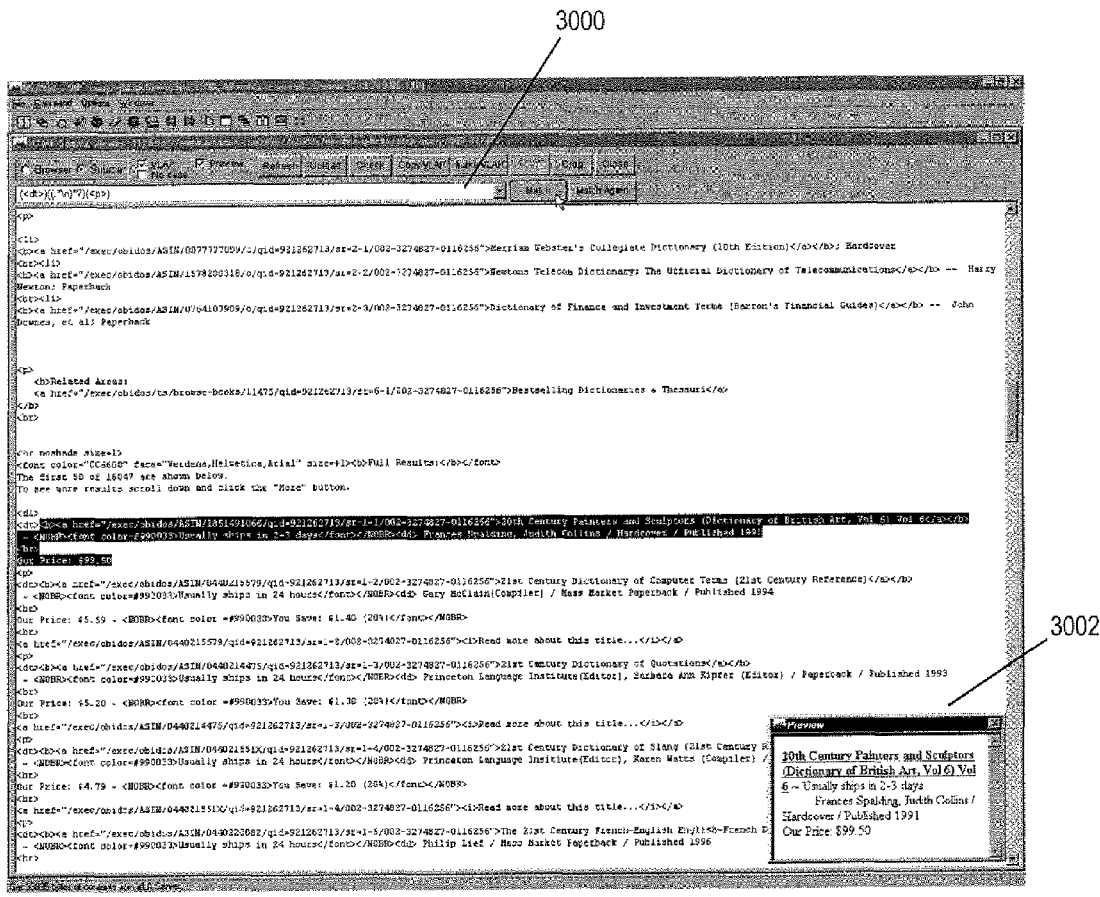

By segmenting the web page into units, later instructions and extractor patterns will only be matched within the units. The units can be described using an extractor pattern. FIG. 30 shows the development of an extractor pattern 3000 to match units from the results page of the Example Bookstore. The preview window 3002 shows a unit as rendered HTML.

Figure 31:
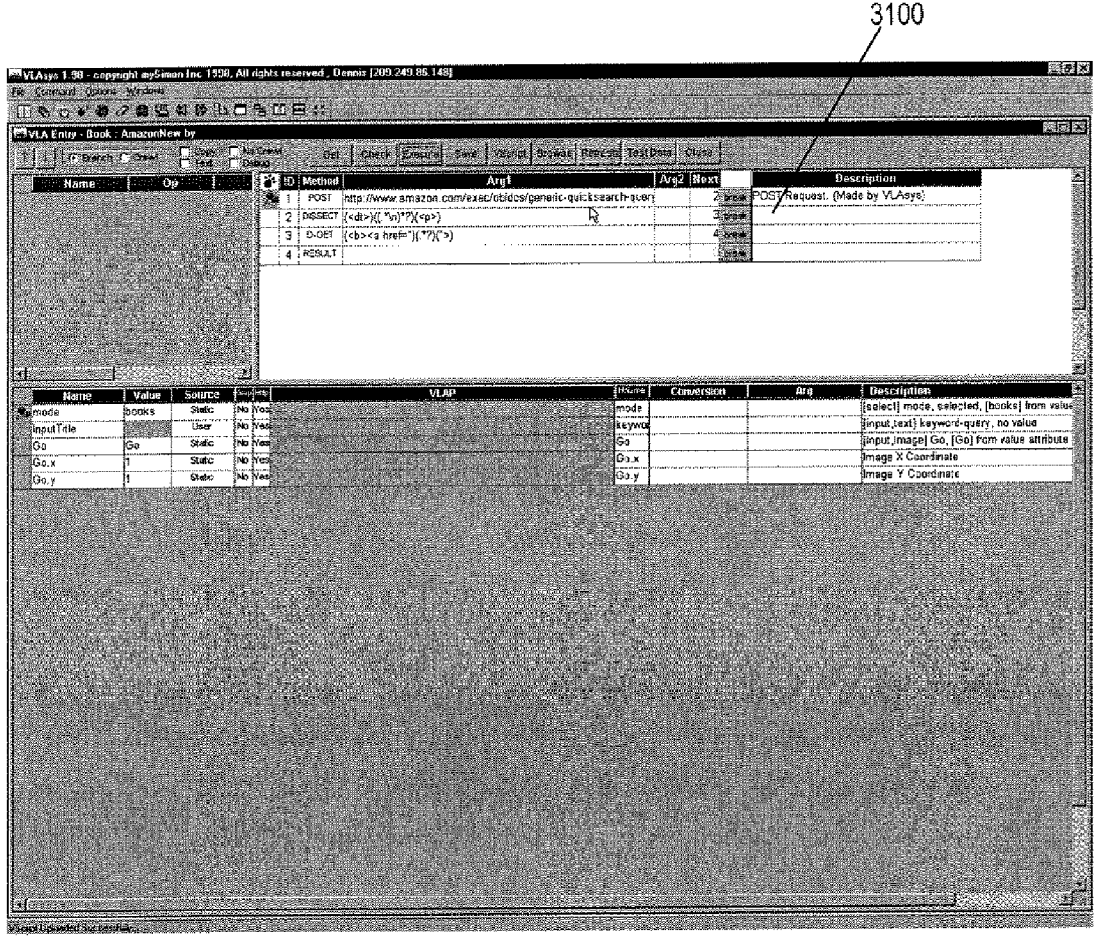
Figure 32:
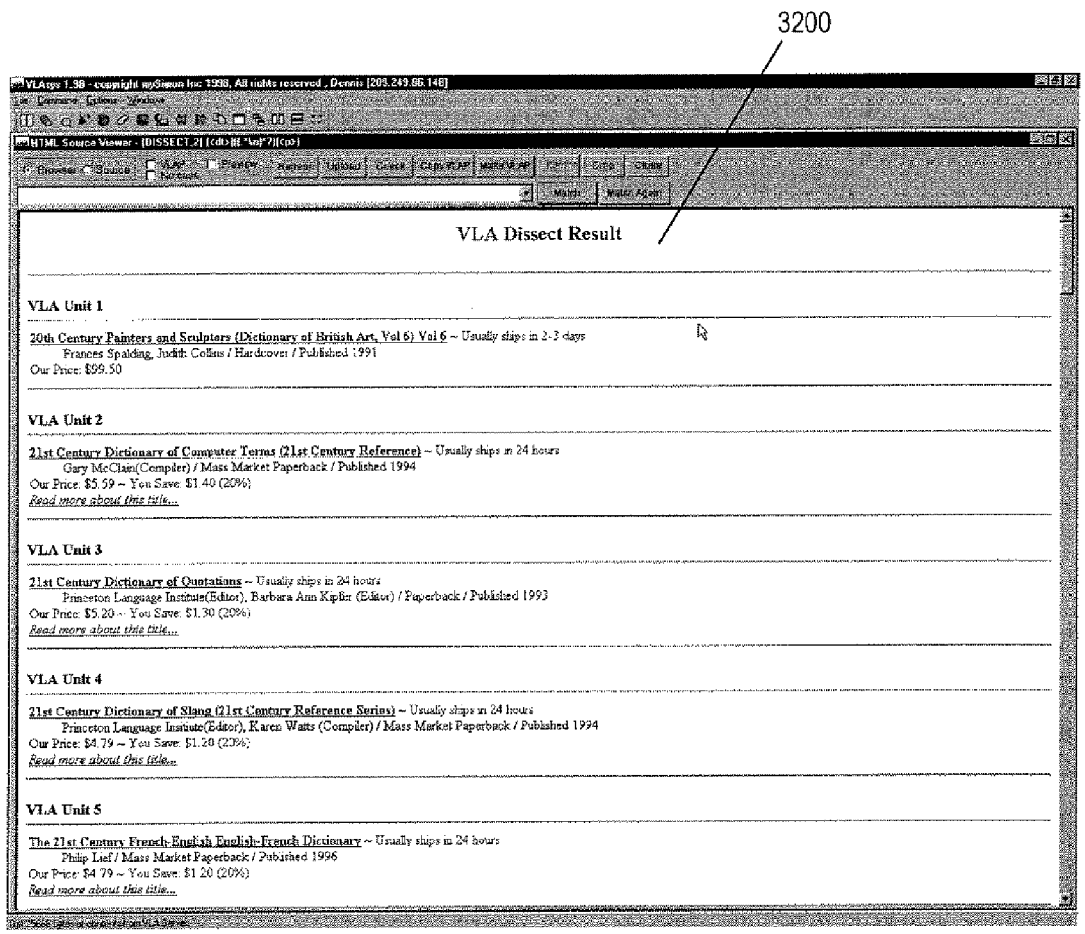

FIG. 31 shows the inclusion of a dissect instruction 3100 in a description of data of interest. FIG. 32 shows the results of the dissect instruction 3100 is the units 3200. Each of the units has a similar structure and all subsequent instructions in the description will operate on each unit as a buffer.

5. Removing Information: Pruning

Figure 33:
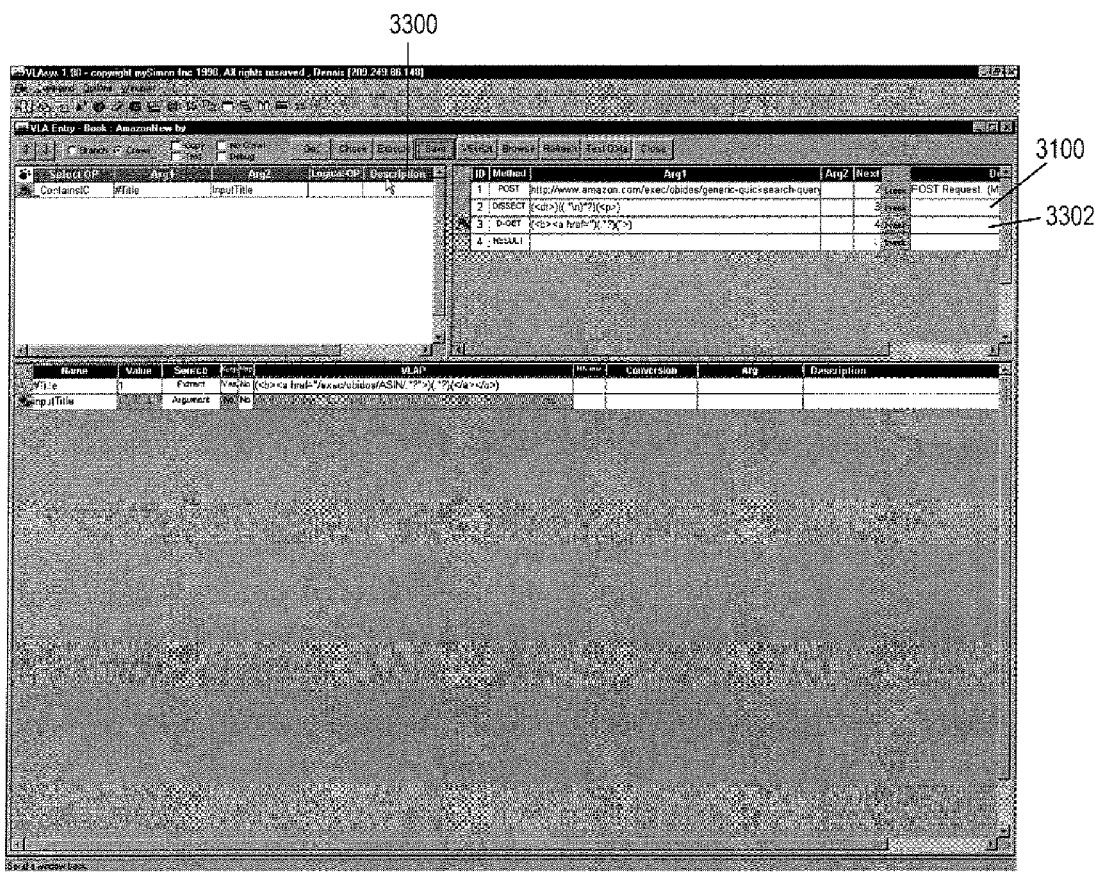

FIG. 33 shows the description of data of interest after adding the dissect instruction 3100. The next refinement will be to prune the units to ensure that all units have the title input in the extracted title. The pruning sub-step 3300 is added to the D-get instruction 3302. A pruning sub-step has a logical operator and one or more arguments. In this example, the logical operator for the pruning sub-step 3300 is the "contains" operator. The arguments for the pruning sub-step are the extracted titles and the input title. In this example, if the input title is "Owen Meany", then units where "Owen Meany" is not part of the extracted title are removed.

6. Branching and Looping a. Extracting Everything

Figure 34:
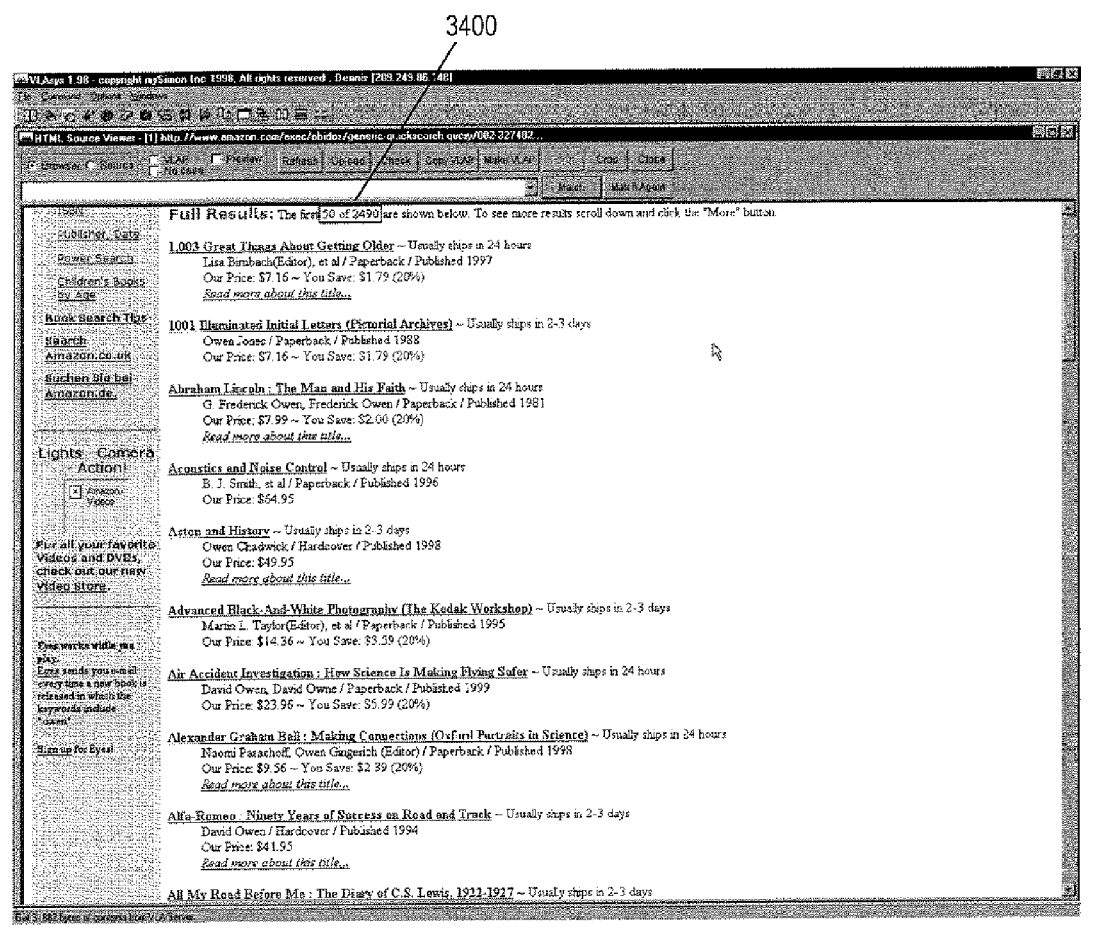

FIG. 34 shows a set of extraction parameters that produced more results than the Example Bookstore web site will show at once. As indicated on the web page at area 3400, only the first 50 of nearly 2500 results with the search string are shown. The web page includes a link to retrieve more results. The additional data of interest can be retrieved by setting up a loop, or a branch, inside the description of data of interest.

Figure 35:
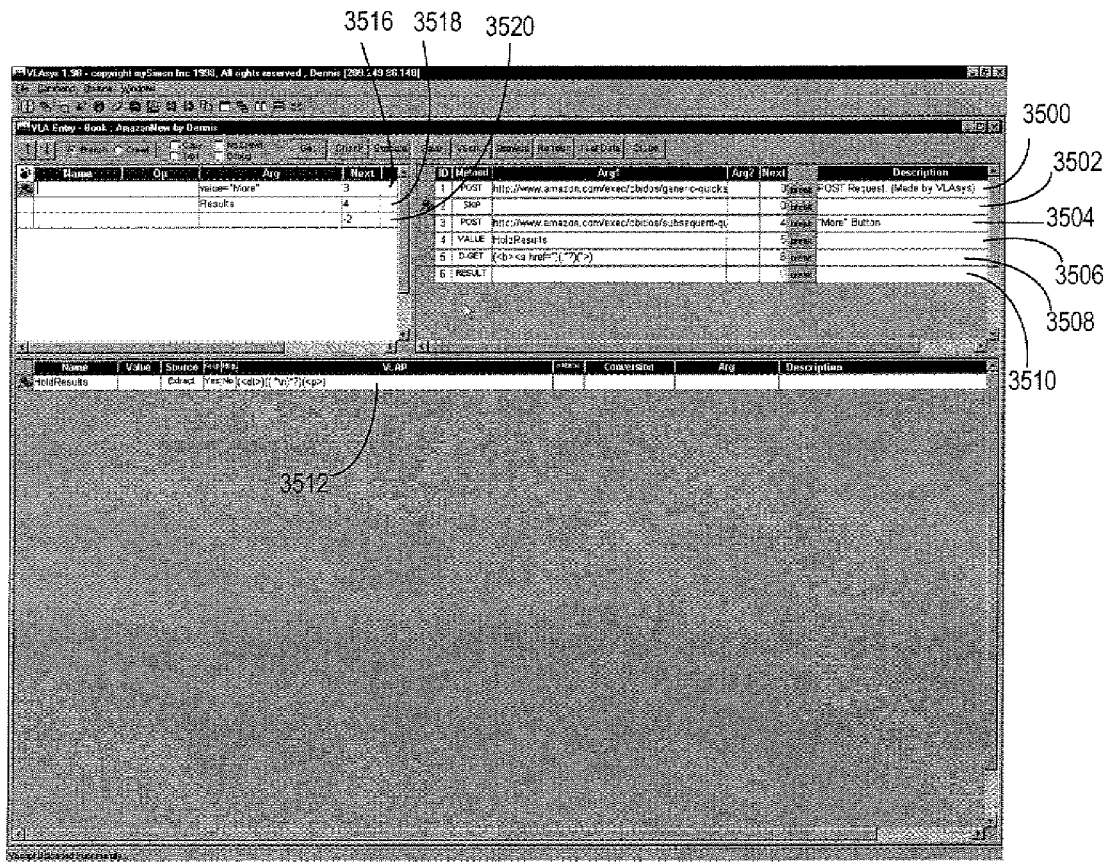

FIG. 35 shows a new description of data of interest that enables the retrieval of a first additional web page with data of interest. The new description has six instructions 3500-3510.

The first instruction is the post instruction 3500, this retrieves a web page based on the title input by the user.

The second instruction is the skip instruction 3502 that is used to store the buffer at sub-step 3512. Depending on whether a link to additional information is detected, the sequence of instructions is controlled with the branch sub-steps 3516-3520.

The skip instruction 3502 has a sub-step 3512 that stores matching portions of the web page for later use. The skip instruction 3502 also has three branch sub-steps 3516-3520. The branch sub-steps are executed in order. The first branch sub-step 3516 tests for the pattern "value="More"" and directs the control of the program to the third step if the pattern is found. This will cause the post instruction 3504 to be executed next. The second branch sub-step 3518 tests for the pattern "Results" and directs control of the program to the fourth step if the pattern is found. This will cause the values instruction 3506 to be executed next. The final branch sub-step 3520 returns an error code indicating that the site has changed. The use of this error code is discussed further in conjunction with FIG. 36.

The third step is post instruction 3504. This requests a page of additional matching entries and is only called if the first branch sub-step 3516 is taken.

The fourth step is the values instruction 3506. The values instruction loads the accumulated web page portions for further processing.

The fifth step is a D-get instruction 3508 to retrieve the sales ranks of all of the accumulated book information from all of the accumulated web pages.

The sixth step is the results instruction 3510 that extracts the required information from the web site.

b. Detecting Errors and Problems

Branching can also be used to detect error conditions. One common error condition is that the extraction parameters produce no results, or the no matching results code. This is signaled by defining a pattern in a branch sub-step that is matched when no results are found.

Figure 36:
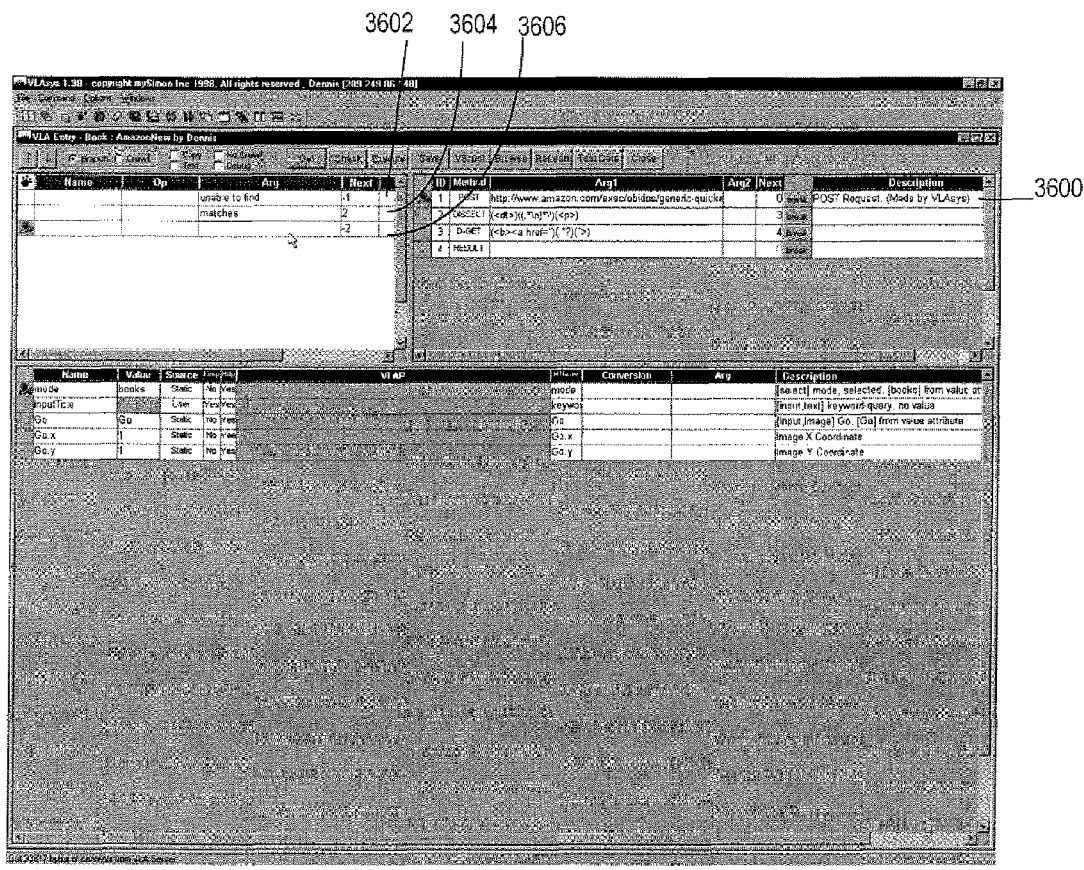

FIG. 36 shows branch sub-steps 3602-3606 being defined for the post instruction 3600. There is a first branch sub-step 3602, if the pattern "unable to find" appears in the result. The control continues at instruction "−1" indicating a no matching products result. The branch sub-step 3604 tests the pattern "matches" to ensure that some results were found. The branch sub-step 3604 causes execution of the description of data of interest to continue at the second instruction, the dissection instruction. Lastly, the branch sub-step 3606 is taken if neither of the first two patterns is found, by continuing control at instruction "−2" indicating a web site changed result.

When there is a web site changed result, the data query and extraction server can send a message to the operator using e-mail, or generate a log entry. Both a no matching products result and a web site changed result stop the execution of the description of data of interest and no extracted data will be returned to the client for the web site that generated the error. The error can be reported to the client, but need not be.

F. Alternative Embodiments

Some embodiments of the invention are included in an electromagnetic wave form. The electromagnetic wave form comprises information such as the GUI description creation program 114 and the programs on the data query and extraction computer 108 for using the descriptions of data of interest to extract data of interest from web sites. For example, the electromagnetic wave form could include signals sent over a network from a server computer to a client computer.

G. CONCLUSION

Thus, a method and apparatus for defining data of interest has been described. The method can be used to describe data of interest on a number of web sites coupled to a network and retrieve matching data of interest from multiple sites.

The foregoing description of various embodiments of the invention have been presented for purposes of illustration and description. It is not intended to limit the invention to the precise forms disclosed. Many modifications and equivalent arrangements will be apparent.

What is claimed is:

1. A computer-implemented method executed by one or more computing devices for extracting data of interest to a user from a web site, the method comprising:
   receiving, by at least one of the one or more computing devices, a description of data of interest from a user, the description of the data of interest being associated with an extraction parameter;
   querying, by at least one of the one or more computing devices, a web site using a value of the extraction parameter and an extraction pattern, the extraction pattern being associated with the description of data of interest, wherein the extraction pattern is adapted to identify at least a portion of an output of a web site and extract information from one or more web pages associated with the web site, and wherein the extraction pattern comprises a regular expression;
   extracting, by at least one of the one or more computing devices, the data of interest from the web site based on the query; and
   storing, by at least one of the one or more computing devices, the extracted data of interest.

2. The method of claim 1, wherein the value of the extraction parameter is received from a user.

3. The method of claim 1, wherein the user provides the description of the data of interest using a graphical user interface tool.

4. The method of claim 3, wherein the graphical user interface tool includes a plurality of descriptions of data of interest associated with a plurality of extraction parameters.

5. The method of claim 1, further comprising:
   obtaining additional data of interest by querying another web site using the value of the extraction parameter and the extraction pattern;
   extracting the additional data of interest from the other web site; and
   storing the additional data of interest.

6. The method of claim 5, wherein the data of interest is provided incrementally as it is obtained from the web sites.

7. The method of claim 5, wherein the data of interest is obtained from the web sites and then presented simultaneously.

8. The method of claim 5, wherein when the data of interest includes data of interest from both web sites, and the data of interest from both web sites is extracted.

9. The method of claim 1, wherein the data of interest is information associated with a product or information associated with a service.

10. A system for extracting data of interest to a user from a web site, the system comprising:
    a processor; and
    memory operatively coupled to the processor and containing instructions that, when executed by the processor, cause the processor to carry out the steps of:
    receiving a description of data of interest from a user, the description of the data of interest being associated with an extraction parameter;
    querying a web site using a value of the extraction parameter and an extraction pattern, the extraction pattern being associated with the description of data of interest, wherein the extraction pattern is adapted to identify at least a portion of an output of a web site and extract information from one or more web pages associated with the web site, and wherein the extraction pattern comprises a regular expression;

extracting the data of interest from the web site based on the query; and storing the extracted data of interest.

11. The system of claim 10, wherein the value of the extraction parameter is received from a user.

12. The system of claim 10, wherein the user provides the description of the data of interest using a graphical user interface tool.

13. The system of claim 12, wherein the graphical user interface tool includes a plurality of descriptions of data of interest associated with a plurality of extraction parameters.

14. The system of claim 10, wherein the instructions, when executed by the processor, further cause the processor to carry out the steps of:

obtaining additional data of interest by querying another web site using the value of the extraction parameter and the extraction pattern;

extracting the additional data of interest from the other web site; and storing the additional data of interest.

15. The system of claim 14, wherein the data of interest is provided incrementally as it is obtained from the web sites.

16. The system of claim 14, wherein the data of interest is obtained from the web sites and then presented simultaneously.

17. The system of claim 14, wherein when the data of interest includes data of interest from both web sites, and the data of interest from both web sites is extracted.

18. The system of claim 10, wherein the data of interest is information associated with a product or information associated with a service.

19. Non-transitory computer readable media having instructions recorded thereon that, when executed by a processor, cause the processor to carry out a method for extracting data of interest to a user from a web site, the method comprising the steps of:

receiving a description of data of interest from a user, the description of the data of interest being associated with an extraction parameter;

querying a web site using a value of the extraction parameter and an extraction pattern, the extraction pattern being associated with the description of data of interest, wherein the extraction pattern is adapted to identify at least a portion of an output of a web site and extract information from one or more web pages associated with the web site, and wherein the extraction pattern comprises a regular expression;

extracting the data of interest from the web site based on the query; and storing the extracted data of interest.

20. The computer-readable media of claim 19, wherein the value of the extraction parameter is received from a user.

21. The computer-readable media of claim 19, wherein the user provides the description of the data of interest using a graphical user interface tool.

22. The computer-readable media of claim 21, wherein the graphical user interface tool includes a plurality of descriptions of data of interest associated with a plurality of extraction parameters.

23. The computer-readable media of claim 19, wherein the instructions, when executed by the processor, further cause the processor to carry out the steps of:

obtaining additional data of interest by querying another web site using the value of the extraction parameter and the extraction pattern;

extracting the additional data of interest from the other web site; and storing the additional data of interest.

24. The computer-readable media of claim 23, wherein the data of interest is provided incrementally as it is obtained from the web sites.

25. The computer-readable media of claim 23, wherein the data of interest is obtained from the web sites and then presented simultaneously.

26. The computer-readable media of claim 23, wherein when the data of interest includes data of interest from both web sites, and the data of interest from both web sites is extracted.

27. The computer-readable media of claim 19, wherein the data of interest is information associated with a product or information associated with a service.

\* \* \* \* \*